(12) United States Patent
Daicho et al.

(10) Patent No.: US 10,370,590 B2
(45) Date of Patent: Aug. 6, 2019

(54) PHOSPHOR

(71) Applicants: Koito Manufacturing Co., Ltd., Tokyo (JP); Tokyo Institute of Technology, Tokyo (JP); National University Corporation Nagoya University, Nagoya-shi, Aichi-ken (JP)

(72) Inventors: Hisayoshi Daicho, Shizuoka (JP); Yu Shinomiya, Shizuoka (JP); Kiminori Enomoto, Shizuoka (JP); Hideo Hosono, Tokyo (JP); Satoru Matsuishi, Tokyo (JP); Hiroshi Sawa, Nagoya (JP); Akitoshi Nakano, Nagoya (JP)

(73) Assignees: KOITO MANUFACTURING CO., LTD., Tokyo (JP); TOKYO INSTITUTE OF TECHNOLOGY, Tokyo (JP); NATIONAL UNIVERSITY CORPORATION NAGOYA UNIVERSITY, Nagoya-shi, Aichi-ken (JP)

( * ) Notice: Subject to any disclaimer, the term of this patent is extended or adjusted under 35 U.S.C. 154(b) by 171 days.

(21) Appl. No.: 15/247,973

(22) Filed: Aug. 26, 2016

(65) Prior Publication Data

US 2017/0058198 A1    Mar. 2, 2017

(30) Foreign Application Priority Data

Aug. 28, 2015 (JP) .................. 2015-169258
Aug. 10, 2016 (JP) .................. 2016-158097

(51) Int. Cl.
C09K 11/77    (2006.01)

(52) U.S. Cl.
CPC ...... *C09K 11/7796* (2013.01); *C09K 11/7739* (2013.01); *C09K 11/7742* (2013.01)

(58) Field of Classification Search
CPC ............ C09K 11/7795; C09K 11/7779; C09K 11/7739
See application file for complete search history.

(56) References Cited

U.S. PATENT DOCUMENTS

| | | | |
|---|---|---|---|
| 5,859,496 A | 1/1999 | Murazaki et al. | |
| 6,608,329 B1 * | 8/2003 | Chen | H01L 33/502 257/79 |
| 8,308,982 B2 * | 11/2012 | Lyons | C09K 11/7739 252/301.4 H |
| 2012/0049116 A1 | 3/2012 | Lyons et al. | |

FOREIGN PATENT DOCUMENTS

| | | |
|---|---|---|
| CN | 102051176 A | 5/2011 |
| CN | 102206489 A | 10/2011 |
| JP | 2005-093912 A | 4/2005 |
| JP | 3837588 B2 | 8/2006 |
| JP | 2008-106224 A | 5/2008 |
| KR | 10-2011-0024426 A | 3/2011 |

OTHER PUBLICATIONS

Nakano et al, "Synchrotron powder X-ray structural analysis of the red phosphor with Eu2+-doped halo-phosphate composition", New academic field research "3-D Active-site Science", Spring School, p. P-4, May 30-31, 2015.*
Translation for Nakano et al, "Synchrotron powder X-ray structural analysis of the red phosphor with Eu2+ -doped halo-phosphate composition", p. P-4, May 30-31, 2015.*
Office Action issued for corresponding Korean Patent Application No. 10-2016-0108953 dated Mar. 29, 2018.*
Wang, Hongwei et al., Red Long Afterglow Material Sr5Al2O7S: Preparation and Light-emitting Properties of Eu2+, (Non-Ferrous Metals, No. 8), May 31, 2013, pp. 53-55, China.
Office Action on corresponding CN application No. 201610742092. X, dated Feb. 24, 2018.
Office Action (Notification of Reason(s) for Refusal), dated Sep. 20, 2017, Korean Patent Office in corresponding Korean Patent Application No. 10-2016-0108953.
Official Action on corresponding KR patent application No. 10-2016-0108953, dated Sep. 19, 2018.
Office Action on corresponding KR application No. 10-2016-0108953, Jan. 8, 2019.
Office Action on corresponding DE application No. 10 2016 115 9241, Feb. 18, 2019.
Huang et al., Novel green-emitting Na2CaPO4F:Eu2+ phosphors for near-ultraviolet white light-emitting diodes, Journal of Luminescence (20110731), 131(7), pp. 1346-1349, DOI: 10.10160jlumin.2011.02.034.

* cited by examiner

*Primary Examiner* — C Melissa Koslow

(57) ABSTRACT

A phosphor is represented by the general formula $$aM^I \cdot M^{II}_{1-x} M^I M^V O_4 : (Re)_x$$

where $M^I$ is at least one atomic element selected from the group consisting of K, Li, Na, Rb, Cs, Fr, Cu, and Ag, with K being essential; $M^{II}$ is at least one atomic element selected from the group consisting of Mg, Ca, Sr, Ba, Ra, Mn, Zn, Cd, and Sn; $M^V$ is at least one atomic element selected from the group consisting of P, V, Nb, Ta, As, Sb, and Bi; X is at least one halogen element, with F being essential; Re is at least one atomic element selected from the group consisting of rare earth elements, with Eu being essential; and a is in the range $0.6 \leq a \leq 1.4$.

5 Claims, 24 Drawing Sheets

PHOSPHOR

CROSS-REFERENCE TO RELATED APPLICATIONS

This application is based upon and claims the benefit of priority from the prior Japanese Patent Application No. 2015-169258, filed on Aug. 28, 2015, and Japanese Patent Application No. 2016-158097, filed on Aug. 10, 2016 the entire contents of which are incorporated herein by reference.

BACKGROUND OF THE INVENTION

1. Field of the Invention

The present invention relates to phosphors.

2. Description of the Related Art

To date, a variety of red phosphors have been developed. For example, a red phosphor with a composition of $CaAlSiN_3$:Eu, $(Ca,Sr)AlSiN_3$:Eu, or $Ca_2Si_5N_8$:Eu has been developed (JP3837588, JP2008-106224, JP2005-093912).

However, conventional red phosphors, including the phosphors with the aforementioned compositions, are mainly nitride phosphors. Synthesizing nitride phosphors requires a specific environment, such as a deoxidized atmosphere or a high-temperature and high-pressure environment, which leads to an increase in the manufacturing cost.

The edge of the excitation spectrum of the just-discussed red phosphors is in a range of 500 to 550 nm. This means that when, in order to realize white light, this sort of red phosphor is used together with a phosphor that emits light in another color, the red phosphor ends up absorbing the light that the blue, green, yellow, or other color phosphor emits, and converts the other color to red. As a consequence, in response to subtle fluctuations in the compositional content of the phosphor or the manner in which it is coated on, large deviation in chromaticity from that of a desired emission color can occur, making adjustment of the color challenging.

SUMMARY OF THE INVENTION

The present invention has been made in view of such an issue and is directed to providing a novel phosphor.

To solve the above problem, a phosphor according to an embodiment of the present invention is expressed by the general formula $aM^I X \cdot M^{II}_{1-x} M^I M^V O_4:(Re)_x$
where $M^I$ is at least one atomic element selected from the group consisting of K, Li, Na, Rb, Cs, Fr, Cu, and Ag, with K being essential; $M^{II}$ is at least one atomic element selected from the group consisting of Mg, Ca, Sr, Ba, Ra, Mn, Zn, Cd, and Sn; $M^V$ is at least one atomic element selected from the group consisting of P, V, Nb, Ta, As, Sb, and Bi; X is at least one halogen element, with F being essential; Re is at least one atomic element selected from the group consisting of rare earth elements, with Eu being essential; and a is in the range $0.6 \leq a \leq 1.4$.

DETAILED DESCRIPTION OF THE INVENTION

Figure 1:
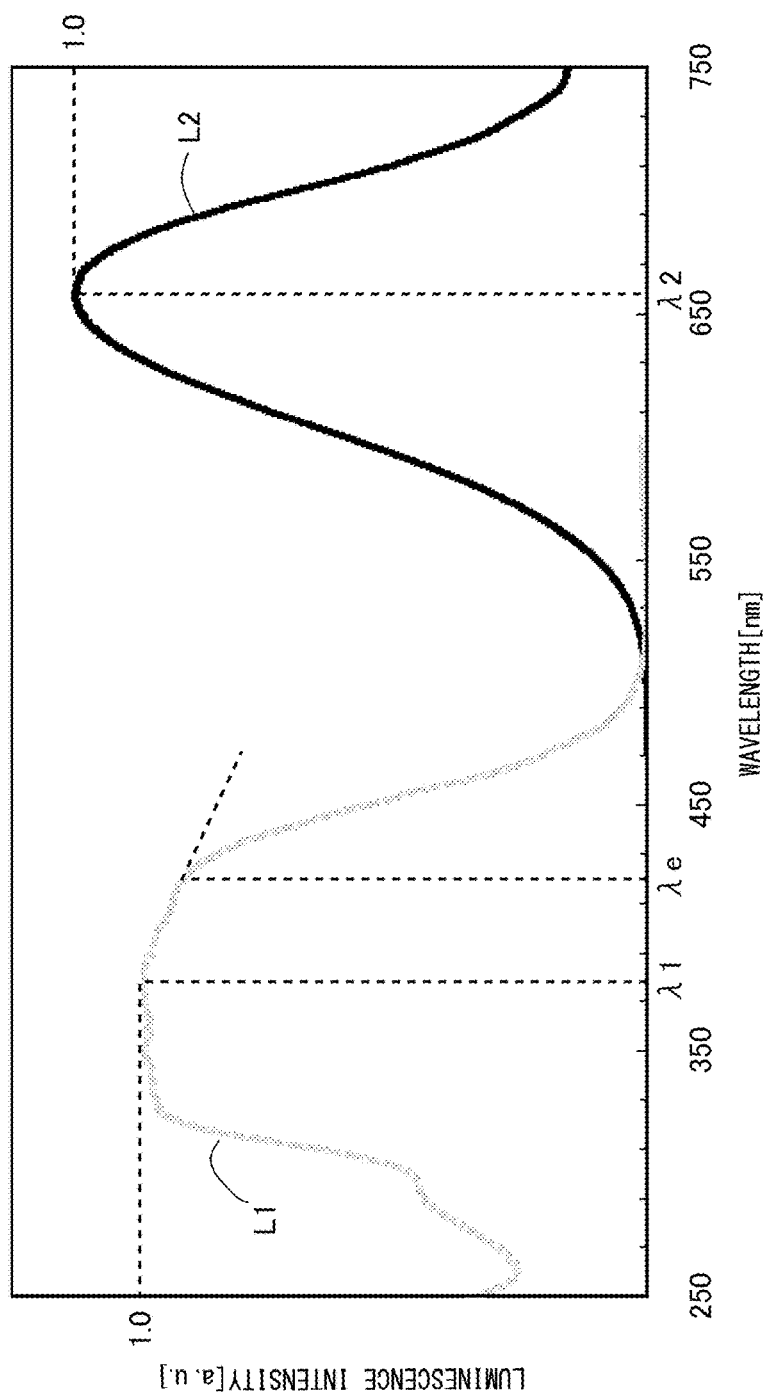
FIG. 1 illustrates an excitation spectrum and an emission spectrum of a phosphor according to Example 1.

The invention will now be described by reference to the preferred embodiments. This does not intend to limit the scope of the present invention, but to exemplify the invention.

A phosphor according to the present embodiment is expressed by the general formula $aM^I X \cdot M^{II}_{1-x} M^I M^V O_4:(Re)_x$
where $M^I$ is at least one atomic element selected from the group consisting of K, Li, Na, Rb, Cs, Fr, Cu, and Ag, with K being essential; $M^{II}$ is at least one atomic element selected from the group consisting of Mg, Ca, Sr, Ba, Ra, Mn, Zn, Cd, and Sn; $M^V$ is at least one atomic element selected from the group consisting of P, V, Nb, Ta, As, Sb, and Bi; X is at least one halogen element, with F being essential; Re is at least one atomic element selected from the group consisting of rare earth elements, with Eu being essential; and a is in the range $0.6 \leq a \leq 1.4$.

According to this embodiment, a novel phosphor in which nitrogen is not an essential element can be obtained, and a low-cost phosphor that does not need to be manufactured in a special environment, such as a deoxidized atmosphere or a high-temperature and high-pressure environment, can be obtained.

An excitation spectrum may have a peak wavelength of no greater than 420 nm, and the excitation spectrum may have an excitation edge of no greater than 450 nm. Thus, the phosphor is less likely to absorb light emitted by a phosphor of another color, which can suppress a variation in the chromaticity that could arise when the phosphor is applied, for example, to an apparatus that achieves white light through color mixing with light emitted by a phosphor of another color.

In the above general formula of the phosphor, x may be in a range of $0.007 \leq x \leq 0.2$.

With regard to this phosphor, an emission spectrum has a peak wavelength in a range from 600 nm to 700 nm, an excitation spectrum has a peak wavelength of no greater than 420 nm, and the excitation spectrum has an excitation edge of no greater than 450 nm.

According to this embodiment, even when white light is to be achieved by using the stated phosphor in combination with, for example, a blue phosphor and a green phosphor, little light having a wavelength of blue or green is absorbed, and the chromaticity can be adjusted with ease.

In an X-ray diffraction pattern in which Cu Kα characteristic X-ray is used, at least part of a crystal included in the phosphor may have a first diffraction peak, a second diffraction peak, and a third diffraction peak in a range in which a diffraction angle 2θ is from 31.0° to 33.0°; when a diffraction intensity of the first diffraction peak, which has the highest intensity, is taken as 100, the diffraction intensities of the second diffraction peak and of the third diffraction peak may be from 30 to 50; and the at least part of the crystal may have a fourth diffraction peak having a diffraction intensity of from 15 to 25 in a range in which the diffraction angle 2θ is from 27.0° to 29.0°. The at least part of the crystal may have a fifth diffraction peak having a diffraction intensity of from 15 to 25 in a range in which the diffraction angle 2θ is from 41.0° to 43.0°. The at least part of the crystal may have a sixth diffraction peak having a diffraction intensity of from 10 to 15 in a range in which the diffraction angle 2θ is from 29.0° to 31.0°. The at least part of the crystal may have a seventh diffraction peak having a diffraction intensity of from 10 to 15 in a range in which the diffraction angle 2θ is from 36.0° to 39.0°. The at least part of the crystal may have an eighth diffraction peak having a diffraction intensity of from 5 to 10 in a range in which the diffraction angle 2θ is from 13.0° to 15.0°.

At least part of a crystal included in the phosphor may have an orthorhombic crystal system, a simple Bravais lattice, and a $P2_1/m$ space group.

Hereinafter, preferred embodiments of the present invention will be described with reference to the drawings. Identical or similar constituent elements, members, and processes illustrated in the drawings are given identical reference characters, and duplicate descriptions thereof will be omitted as appropriate. In addition, the embodiments are not intended to limit the invention but are illustrative in nature. Not all of the features described in the embodiments and combinations thereof are necessarily essential to the invention.

A phosphor according to the present embodiment is a phosphor that is efficiently excited by ultraviolet radiation or short-wavelength visible light and emits light. Specifically, the phosphor exhibits intense excitation with near-ultraviolet light or short-wavelength visible light having a wavelength of no greater than 420 nm and emits red light whose emission spectrum has a peak wavelength of no less than 600 nm. The phosphor according to the present embodiment achieves red light emission as a host crystal of a halo-oxide is doped with an activator such as a $Eu^{2+}$ ion.

The phosphor according to the present embodiment is a red phosphor having a large Stokes shift (approximately 0.8 eV to 1.2 eV). Therefore, the phosphor is less likely to absorb visible light emitted by another phosphor of blue, green, yellow, or the like. The Stokes shift is a difference in energy between the excitation edge wavelength and the peak wavelength of the emission spectrum. Here, the excitation edge wavelength is a wavelength in an excitation spectrum at which the excitation intensity starts to drop sharply on the longer wavelength side.

The phosphor according to the present embodiment will now be described in detail. The phosphor according to the present embodiment is expressed by the general formula

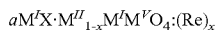

$$aM^I X \cdot M^{II}_{1-x} M^I M^V O_4 : (Re)_x$$

wherein $M^I$ is at least one atomic element selected from the group consisting of K, Li, Na, Rb, Cs, Fr, Cu, and Ag, with K being essential; $M^{II}$ is at least one atomic element selected from the group consisting of Mg, Ca, Sr, Ba, Ra, Mn, Zn, Cd, and Sn; $M^V$ is at least one atomic element selected from the group consisting of P, V, Nb, Ta, As, Sb, and Bi; X is at least one halogen element, with F being essential; Re is at least one atomic element selected from the group consisting of rare earth elements, with Eu being essential; and a is in the range $0.6 \leq a \leq 1.4$.

Hereinafter, the phosphor will be described in more concrete terms on the basis of examples, but it is to be understood that the raw materials for the phosphor, the manufacturing methods, the chemical compositions, and so on of the phosphors described hereinafter are not intended to limit the embodiments of the phosphor according to the present invention.

EXAMPLE 1

A phosphor according to Example 1 is a phosphor represented by $KF \cdot Ca_{0.99}KPO_4 : Eu^{2+}_{0.01}$. The phosphor according to Example 1 is manufactured through the following method. First, KF and $K_2CO_3$ powders were dried for two hours at 150° C. Then, in a glove box filled with dry $N_2$, KF, $K_2CO_3$, $CaHPO_4$, $(NH_3)_2HPO_4$, and $Eu_2O_3$ were precisely measured to achieve a stoichiometric ratio of 1.000:0.500: 0.990:0.010:0.0050 (mol) and crushed and mixed in an alumina mortar, and a raw material powder mixture was obtained. This raw material powder mixture was placed in an alumina crucible and baked at 1000° C. for six hours, and thus baked powder was obtained. Baking was carried out under a mixed gas atmosphere of $N_2/H_2=95/5$. Then, the obtained baked powder was cleaned with pure water, and the phosphor according to Example 1 was obtained.

[Composition Analysis]

The powder sample obtained in Example 1 was embedded in a transparent resin, and the resin was polished so that the measurement surface becomes planar. Then, the composition was analyzed with the use of an electron probe micro-analyzer (EPMA) (manufactured by JEOL Ltd.). The result has revealed that the phosphor according to Example 1 has a composition ratio of $KF \cdot Ca_{1-x} KPO_4 : Eu^{2+}_x$.

[Excitation Spectrum and Emission Spectrum]

FIG. 1 illustrates an excitation spectrum and an emission spectrum of the phosphor according to Example 1. The excitation spectrum and the emission spectrum were measured at a room temperature with the use of a multi-channel optical spectrometer (PMA C5966-31 manufactured by Hamamatsu Photonics K.K.). The emission spectrum was measured with excitation at 400 nm. The excitation spectrum was measured with the monitor wavelength set to the emission peak wavelength obtained with excitation at 400 nm.

As illustrated in FIG. 1, the excitation spectrum L1 of the phosphor according to Example 1 has a peak wavelength λ1 in a range from 330 nm to 420 nm, or more specifically, in a range from 350 nm to 390 nm. In addition, the excitation edge wavelength λe is approximately 420 nm, and the energy at that wavelength is 2.938 eV. In the meantime, the emission spectrum L2 has a peak wavelength λ2 of 658 nm and a peak width at half height of 152 nm, and the energy at the peak wavelength λ2 is 1.884 eV. Accordingly, the Stokes shift is 1.054 eV. The chromaticity coordinates (cx,cy) of light emitted by this phosphor are (0.613,0.384).

[X-Ray Diffraction Pattern]

Figure 2:
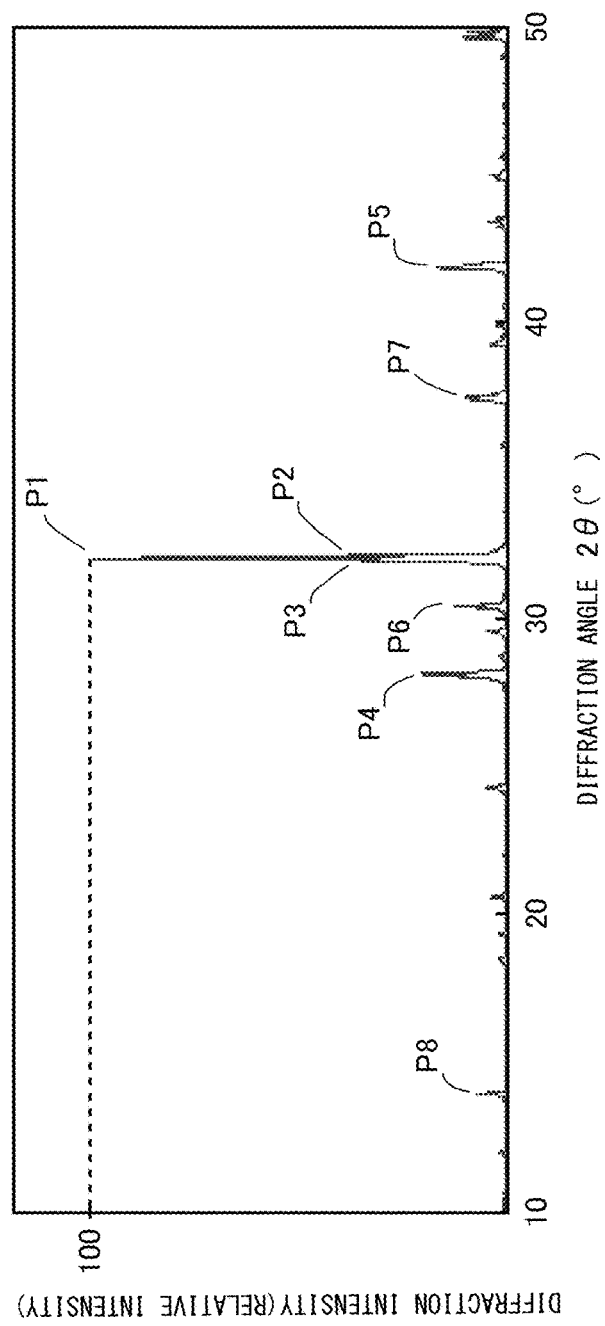
FIG. 2 illustrates an X-ray diffraction pattern of the phosphor according to Example 1.

Next, X-ray diffractometry will be described. First, X-ray powder diffractometry was carried out with an X-ray powder diffractometer (RINT Ultima III manufactured by Rigaku Corporation) with the use of an X-ray tube having Cu Kα radiation under the condition that the sampling width was 0.01° and the scan speed was 0.05°/min. The diffraction pattern observed through the measurement is illustrated in FIG. 2. FIG. 2 illustrates an X-ray diffraction pattern of the phosphor according to Example 1.

As illustrated in FIG. 2, in the X-ray diffraction pattern in which Cu Kα characteristic X-ray is used, at least part of a crystal included in the phosphor according to Example 1 has a first diffraction peak P1, a second diffraction peak P2, and a third diffraction peak P3 in a range in which a diffraction angle 2θ is from 31.0° to 33.0°; and when the diffraction intensity of the first diffraction peak P1, which has the highest intensity, is taken as 100, the diffraction intensities of the second diffraction peak P2 and of the third diffraction peak P3 are from 30 to 50. In addition, a fourth diffraction peak P4 having a diffraction intensity of from 15 to 25 is in a range in which the diffraction angle 2θ is from 27.0° to 29.0°. A fifth diffraction peak P5 having a diffraction intensity of from 15 to 25 is in a range in which the diffraction angle 2θ is from 41.0° to 43.0°. A sixth diffraction peak P6 having a diffraction intensity of from 10 to 15 is in a range in which the diffraction angle 2θ is from 29.0° to 31.0°. A seventh diffraction peak P7 having a diffraction intensity of from 10 to 15 is in a range in which the diffraction angle 2θ is from 36.0° to 39.0°. An eighth diffraction peak P8 having a diffraction intensity of from 5 to 10 is in a range in which the diffraction angle 2θ is from 13.0° to 15.0°.

The crystal system, the Bravais lattice, the space group, and the lattice constant of the phosphor according to the present embodiment were obtained as follows with the use of a data processing software application (Rapid Auto from Rigaku Corporation) on the basis of the X-ray diffraction pattern obtained through the measurement of the powder sample of the phosphor according to Example 1.

crystal system: orthorhombic crystal
Bravais lattice: simple lattice
space group: $P2_1/m$
lattice constant:
a=5.86 Å
b=7.33 Å
c=12.67 Å
α=β=90° γ=90.22°
V=546.47 Å$^3$ Thereafter, the atomic coordinates were determined with the use of a crystal structure analyzing software application. The result of this analysis has revealed that the above-described crystal is a crystal having a novel structure that is not registered in the International Center for Diffraction Data (ICDD), which is X-ray diffraction database widely used in the X-ray diffractometry.

The relationship between the elements and their atomic coordinates is indicated in Table 1.

TABLE 1

| ELEMENT | SITE | x | y | z |
|---|---|---|---|---|
| K1 | 4c | 0.25000 | 0.28860 | −0.07500 |
| K2 | 4c | 0.25000 | −0.00400 | 0.18890 |
| Ca | 4c | 0.75000 | 0.20270 | 0.07000 |
| P | 4c | 0.25000 | 0.48670 | 0.15960 |
| O2 | 8d | 0.03950 | 0.37750 | 0.13030 |
| O3 | 4c | 0.25000 | 0.67080 | 0.10150 |
| O5 | 4c | 0.25000 | 0.52400 | 0.27950 |
| F | 4a | 0.50000 | 1.00000 | 0.00000 |
| Eu | 4c | 0.75000 | 0.20270 | 0.07000 |

The emission chromaticity (cx,cy) with excitation at 400 nm, the peak wavelength λ2 [nm], the peak width at half height [nm] of the emission spectrum, the Stokes shift [eV] of the phosphor according to Example 1 and of phosphors according to Example 2 through Example 34 described later are shown in Table 2. In each of the examples, it was confirmed that the phosphor emitted red light and had a large Stokes shift.

TABLE 2

| EXAMPLE | CHROMATICITY cx | CHROMATICITY cy | PEAK WAVELENGTH (nm) | PEAK WIDTH AT HALF HEIGHT (nm) | STOKES SHIFT (eV) |
|---|---|---|---|---|---|
| 1 | 0.613 | 0.384 | 658 | 152 | 1.054 |
| 2 | 0.595 | 0.399 | 659 | 158 | 1.057 |
| 3 | 0.596 | 0.398 | 665 | 159 | 1.074 |
| 4 | 0.591 | 0.403 | 663 | 156 | 1.098 |
| 5 | 0.582 | 0.411 | 656 | 157 | 1.041 |
| 6 | 0.595 | 0.404 | 660 | 158 | 1.059 |
| 7 | 0.552 | 0.377 | 658 | 156 | 1.064 |
| 8 | 0.599 | 0.399 | 664 | 156 | 1.071 |
| 9 | 0.616 | 0.382 | 656 | 152 | 1.048 |
| 10 | 0.539 | 0.379 | 658 | 157 | 1.06 |
| 11 | 0.593 | 0.402 | 660 | 155 | 1.07 |
| 12 | 0.574 | 0.417 | 662 | 158 | 1.065 |
| 13 | 0.602 | 0.394 | 659 | 154 | 1.05 |
| 14 | 0.555 | 0.371 | 655 | 157 | 1.045 |
| 15 | 0.588 | 0.405 | 662 | 158 | 1.073 |
| 16 | 0.613 | 0.385 | 666 | 153 | 1.086 |
| 17 | 0.611 | 0.386 | 661 | 154 | 1.072 |
| 18 | 0.615 | 0.383 | 656 | 152 | 1.042 |
| 19 | 0.606 | 0.390 | 657 | 150 | 1.051 |
| 20 | 0.606 | 0.390 | 657 | 151 | 1.058 |
| 21 | 0.613 | 0.384 | 667 | 155 | 1.091 |
| 22 | 0.614 | 0.384 | 662 | 153 | 1.065 |
| 23 | 0.612 | 0.386 | 656 | 151 | 1.048 |
| 24 | 0.612 | 0.386 | 659 | 153 | 1.057 |
| 25 | 0.608 | 0.389 | 662 | 155 | 1.065 |
| 26 | 0.609 | 0.388 | 657 | 157 | 1.07 |
| 27 | 0.609 | 0.389 | 659 | 155 | 1.05 |
| 28 | 0.607 | 0.390 | 661 | 157 | 1.062 |
| 29 | 0.607 | 0.391 | 660 | 156 | 1.059 |
| 30 | 0.595 | 0.399 | 657 | 158 | 1.051 |
| 31 | 0.608 | 0.390 | 659 | 155 | 1.0791 |
| 32 | 0.607 | 0.390 | 660 | 155 | 1.059 |
| 33 | 0.610 | 0.387 | 658 | 153 | 1.054 |
| 34 | 0.613 | 0.384 | 667 | 151 | 1.095 |
| 35 | 0.602 | 0.390 | 660 | 164 | 1.058 |
| 36 | 0.590 | 0.387 | 659 | 162 | 1.052 |
| 37 | 0.610 | 0.380 | 660 | 164 | 1.061 |

TABLE 2-continued

| EXAM-PLE | CHROMA-TICITY cx | CHROMA-TICITY cy | PEAK WAVE-LENGTH (nm) | PEAK WIDTH AT HALF HEIGHT (nm) | STOKES SHIFT (eV) |
|---|---|---|---|---|---|
| 38 | 0.598 | 0.385 | 652 | 159 | 1.048 |
| 39 | 0.511 | 0.382 | 659 | 159 | 1.060 |
| 40 | 0.609 | 0.376 | 661 | 154 | 1.054 |

EXAMPLE 2

A phosphor according to Example 2 is a phosphor represented by $KF \cdot (Ca_{0.97},Sr_{0.01})KPO_4:Eu^{2+}_{0.02}$. The phosphor according to Example 2 is manufactured through the following method. First, KF and $K_2CO_3$ powders were dried for two hours at 150° C. Then, in a glove box filled with dry $N_2$, KF, $K_2CO_3$, $CaHPO_4$, $Sr(NO_3)_2$, $(NH_3)_2HPO_4$, and $Eu_2O_3$ were precisely measured to achieve a stoichiometric ratio of 1.000:0.500:0.970:0.010:0.030:0.010 (mol) and crushed and mixed in an alumina mortar, and a raw material powder mixture was obtained. Processes similar to those in Example 1 were carried out thereafter, and the phosphor according to Example 2 was obtained.

EXAMPLE 3

A phosphor according to Example 3 is a phosphor represented by $KF \cdot (Ca_{0.982}, Ba_{0.005}, Mg_{0.005})KPO_4:Eu^{2+}_{0.008}$. The phosphor according to Example 3 is manufactured through the following method. First, KF and $K_2CO_3$ powders were dried for two hours at 150° C. Then, in a glove box filled with dry $N_2$, KF, $K_2CO_3$, $CaHPO_4$, $Ba(NO_3)_2$, $MgCO_3$, $(NH_3)_2HPO_4$, and $Eu_2O_3$ were precisely measured to achieve a stoichiometric ratio of 1.000:0.500:0.982:0.005:0.005:0.020:0.004 (mol) and crushed and mixed in an alumina mortar, and a raw material powder mixture was obtained. Processes similar to those in Example 1 were carried out thereafter, and the phosphor according to Example 3 was obtained.

EXAMPLE 4

Figure 3:
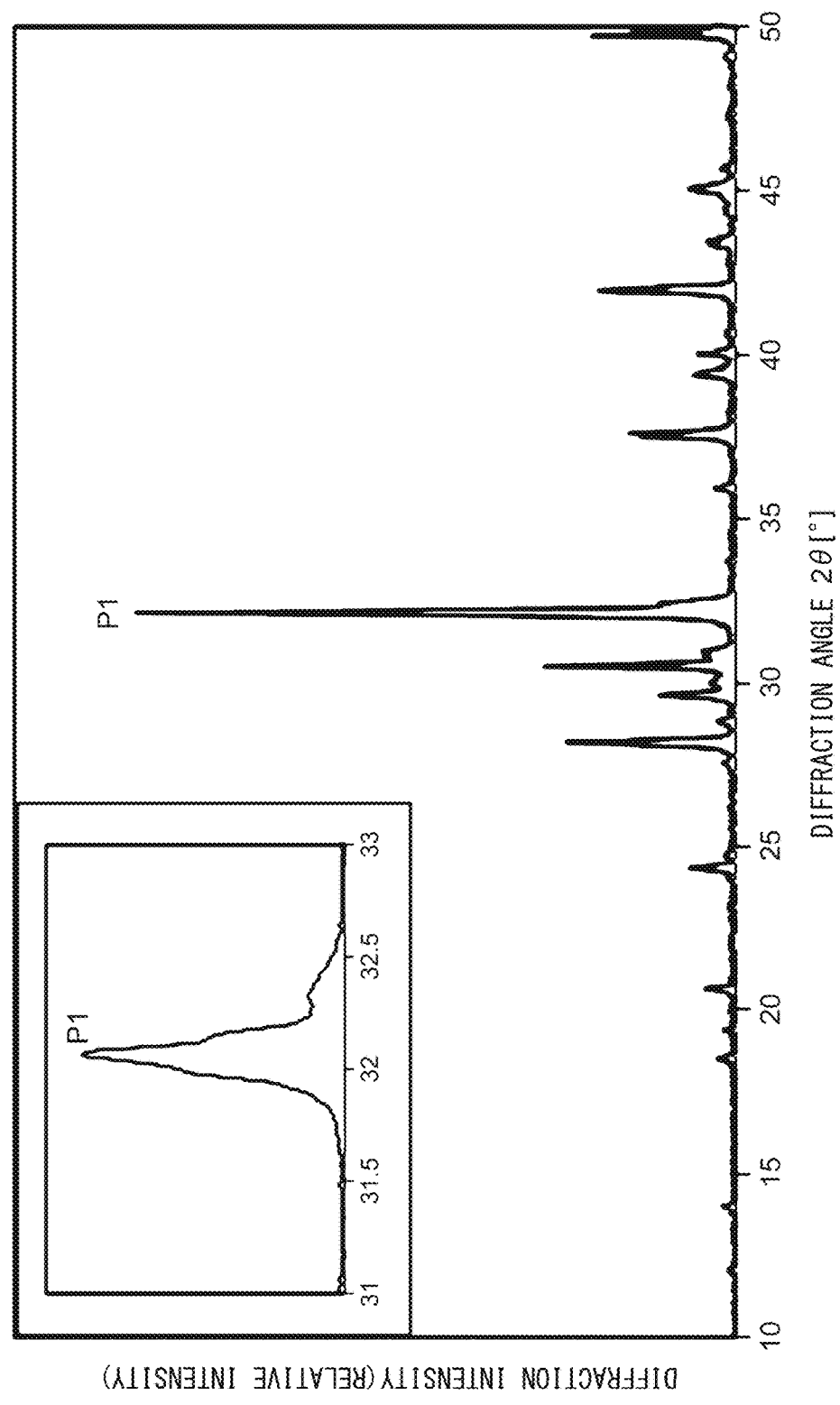
FIG. 3 illustrates an X-ray diffraction pattern of a phosphor according to Example 4.
Figure 4:
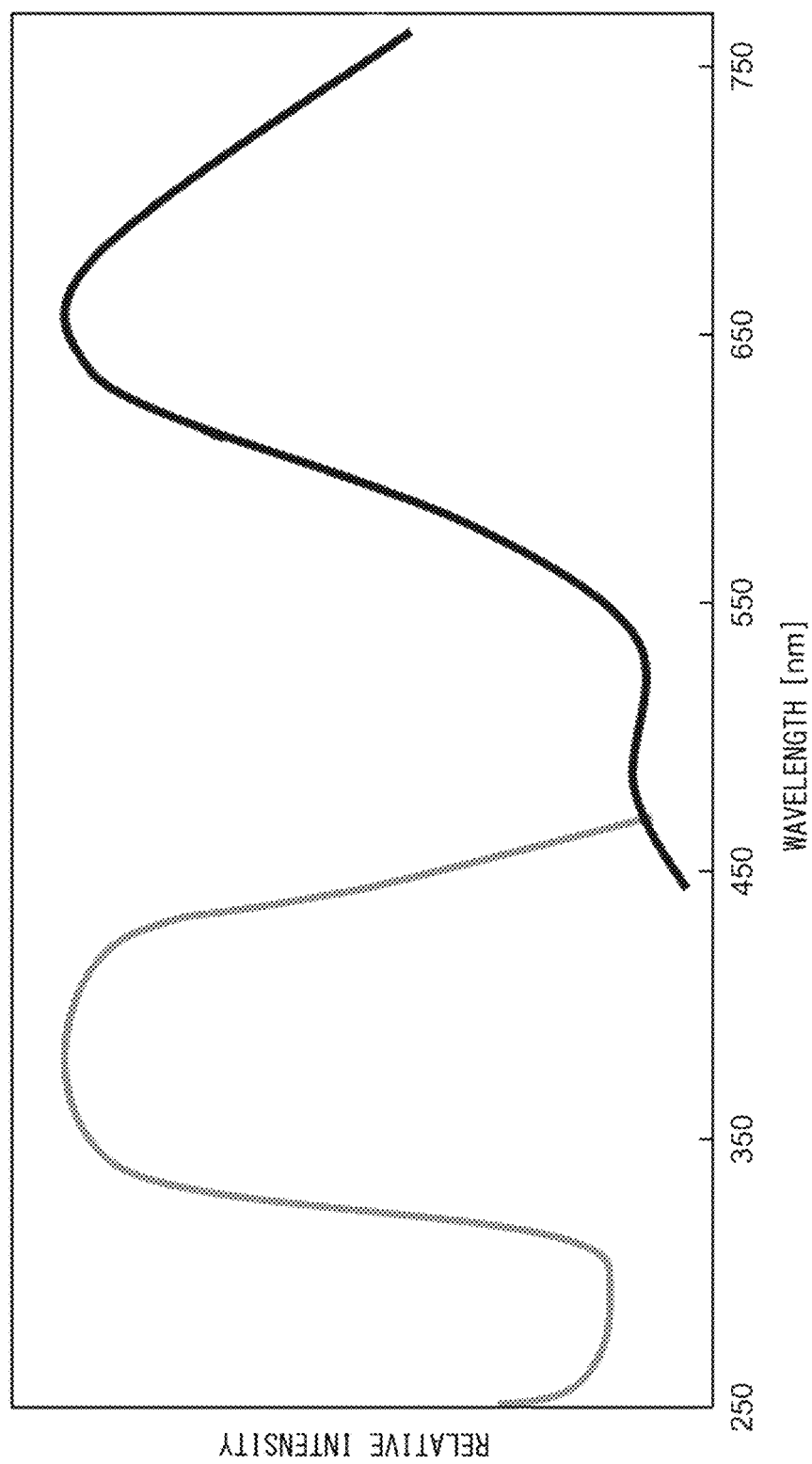
FIG. 4 illustrates an excitation spectrum and an emission spectrum of the phosphor according to Example 4.

A phosphor according to Example 4 is a phosphor represented by $KF \cdot (Ca_{0.96},Sn_{0.005},Zn_{0.005}) KPO_4:Eu^{2+}_{0.03}$. The phosphor according to Example 4 is manufactured through the following method. First, KF and $K_2CO_3$ powders were dried for two hours at 150° C. Then, in a glove box filled with dry $N_2$, KF, $K_2CO_3$, $CaHPO_4$, SnO, ZnO, $(NH_3)_2HPO_4$, and $Eu_2O_3$ were precisely measured to achieve a stoichiometric ratio of 1.000:0.500:0.960:0.005:0.005:0.040:0.015 (mol) and crushed and mixed in an alumina mortar, and a raw material powder mixture was obtained. Processes similar to those in Example 1 were carried out thereafter, and the phosphor according to Example 4 was obtained. FIG. 3 illustrates an X-ray diffraction pattern of the phosphor according to Example 4. It is to be noted that the measurement of the X-ray diffraction pattern in Example 4 and thereafter was carried out under the condition that the sampling width was 0.02° and the scan speed was 2.0°/min. FIG. 4 illustrates an excitation spectrum and an emission spectrum of the phosphor according to Example 4.

EXAMPLE 5

A phosphor according to Example 5 is a phosphor represented by $KF \cdot (Ca_{0.985},Mn_{0.005})KPO_4:Eu^{2+}_{0.01}$. The phosphor according to Example 5 is manufactured through the following method. First, KF and $K_2CO_3$ powders were dried for two hours at 150° C. Then, in a glove box filled with dry $N_2$, KF, $K_2CO_3$, $CaHPO_4$, $MnCO_3$, $(NH_3)_2HPO_4$, and $Eu_2O_3$ were precisely measured to achieve a stoichiometric ratio of 1.000:0.500:0.985:0.005:0.015:0.005 (mol) and crushed and mixed in an alumina mortar, and a raw material powder mixture was obtained. Processes similar to those in Example 1 were carried out thereafter, and the phosphor according to Example 5 was obtained.

EXAMPLE 6

A phosphor according to Example 6 is a phosphor represented by $KF \cdot (Ca_{0.795}Cd_{0.005})KPO_4:Eu^{2+}_{0.2}$. The phosphor according to Example 6 is manufactured through the following method. First, KF and $K_2CO_3$ powders were dried for two hours at 150° C. Then, in a glove box filled with dry $N_2$, KF, $K_2CO_3$, $CaHPO_4$, $CdCO_3$, $(NH_3)_2HPO_4$, and $Eu_2O_3$ were precisely measured to achieve a stoichiometric ratio of 1.000:0.500:0.795:0.005:0.205:0.100 (mol) and crushed and mixed in an alumina mortar, and a raw material powder mixture was obtained. Processes similar to those in Example 1 were carried out thereafter, and the phosphor according to Example 6 was obtained.

As shown in Example 2 through Example 6 above, the phosphor that emits red light according to the present embodiment can be obtained even when part of the contained Ca ion is replaced with another divalent metal ion ($M^{II}$ see Table 2). In addition, as in the phosphors according to Example 2 through Example 6 described above, the phosphor that emits red light according to the present embodiment can be obtained as long as x falls within a range of 0.007≤x≤0.2 in the general formula (see Table 2).

EXAMPLE 7

Figure 5:
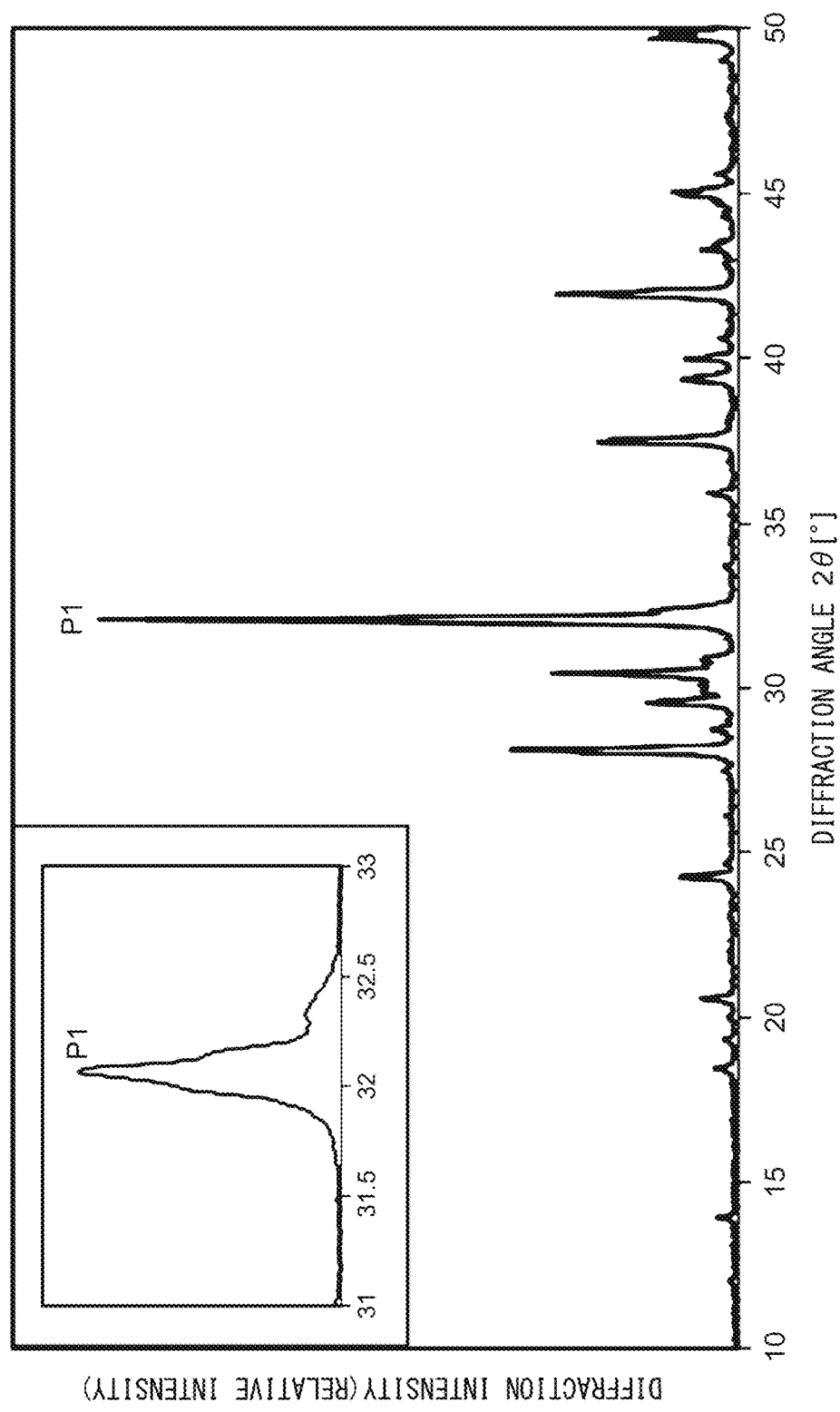
FIG. 5 illustrates an X-ray diffraction pattern of a phosphor according to Example 7.
Figure 6:
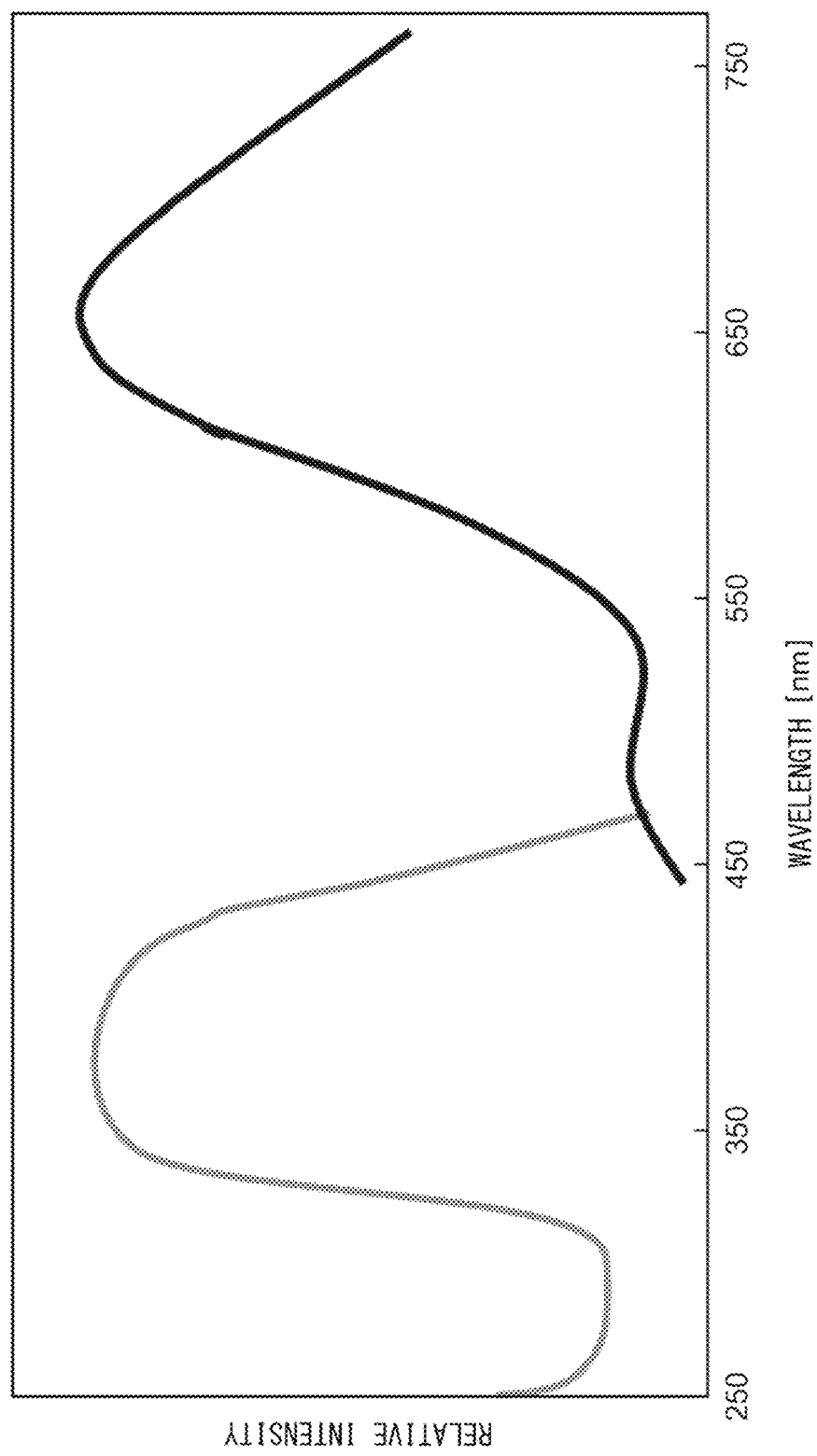
FIG. 6 illustrates an excitation spectrum and an emission spectrum of the phosphor according to Example 7.

A phosphor according to Example 7 is a phosphor represented by $K(F_{0.995},Cl_{0.005}) \cdot Ca_{0.99}KPO_4:Eu^{2+}_{0.01}$. The phosphor according to Example 7 is manufactured through the following method. First, KF and $K_2CO_3$ powders were dried for two hours at 150° C. Then, in a glove box filled with dry $N_2$, KF, $K_2CO_3$, KCl, $CaHPO_4$, $(NH_3)_2HPO_4$, and $Eu_2O_3$ were precisely measured to achieve a stoichiometric ratio of 0.995:0.500:0.005:0.990:0.010:0.005 (mol) and crushed and mixed in an alumina mortar, and a raw material powder mixture was obtained. Processes similar to those in Example 1 were carried out thereafter, and the phosphor according to Example 7 was obtained. FIG. 5 illustrates an X-ray diffraction pattern of the phosphor according to Example 7. FIG. 6 illustrates an excitation spectrum and an emission spectrum of the phosphor according to Example 7.

EXAMPLE 8

A phosphor according to Example 8 is a phosphor represented by $K(F_{0.995},Br_{0.005}) \cdot Ca_{0.95}KPO_4:Eu^{2+}_{0.03}$. The phosphor according to Example 8 is manufactured through the following method. First, KF, $K_2CO_3$, and KBr powders were dried for two hours at 150° C. Then, in a glove box filled with dry $N_2$, KF, $K_2CO_3$, KBr, $CaHPO_4$, $(NH_3)_2HPO_4$, and $Eu_2O_3$ were precisely measured to achieve a stoichiometric ratio of 0.995:0.500:0.005:0.950:0.050:0.025 (mol) and crushed and mixed in an alumina mortar, and a raw material powder mixture was obtained. Processes similar to those in Example 1 were carried out thereafter, and the phosphor according to Example 8 was obtained.

EXAMPLE 9

A phosphor according to Example 9 is a phosphor represented by $K(F_{0.995},I_{0.005}) \cdot Ca_{0.96}KPO_4:Eu^{2+}_{0.04}$. The phosphor according to Example 9 is manufactured through the following method. First, KF, $K_2CO_3$, and KI powders were dried for two hours at 150° C. Then, in a glove box filled with dry $N_2$, KF, $K_2CO_3$, KI, $CaHPO_4$, $(NH_3)_2HPO_4$, and $Eu_2O_3$ were precisely measured to achieve a stoichiometric ratio of 0.995:0.500:0.005:0.990:0.010:0.05 (mol) and crushed and mixed in an alumina mortar, and a raw material powder mixture was obtained. Processes similar to those in Example 1 were carried out thereafter, and the phosphor according to Example 9 was obtained.

As shown in Example 7 through Example 9 above, the phosphor that emits red light according to the present embodiment can be obtained even when part of the F element is replaced with another halogen element (see Table 2).

EXAMPLE 10

Figure 7:
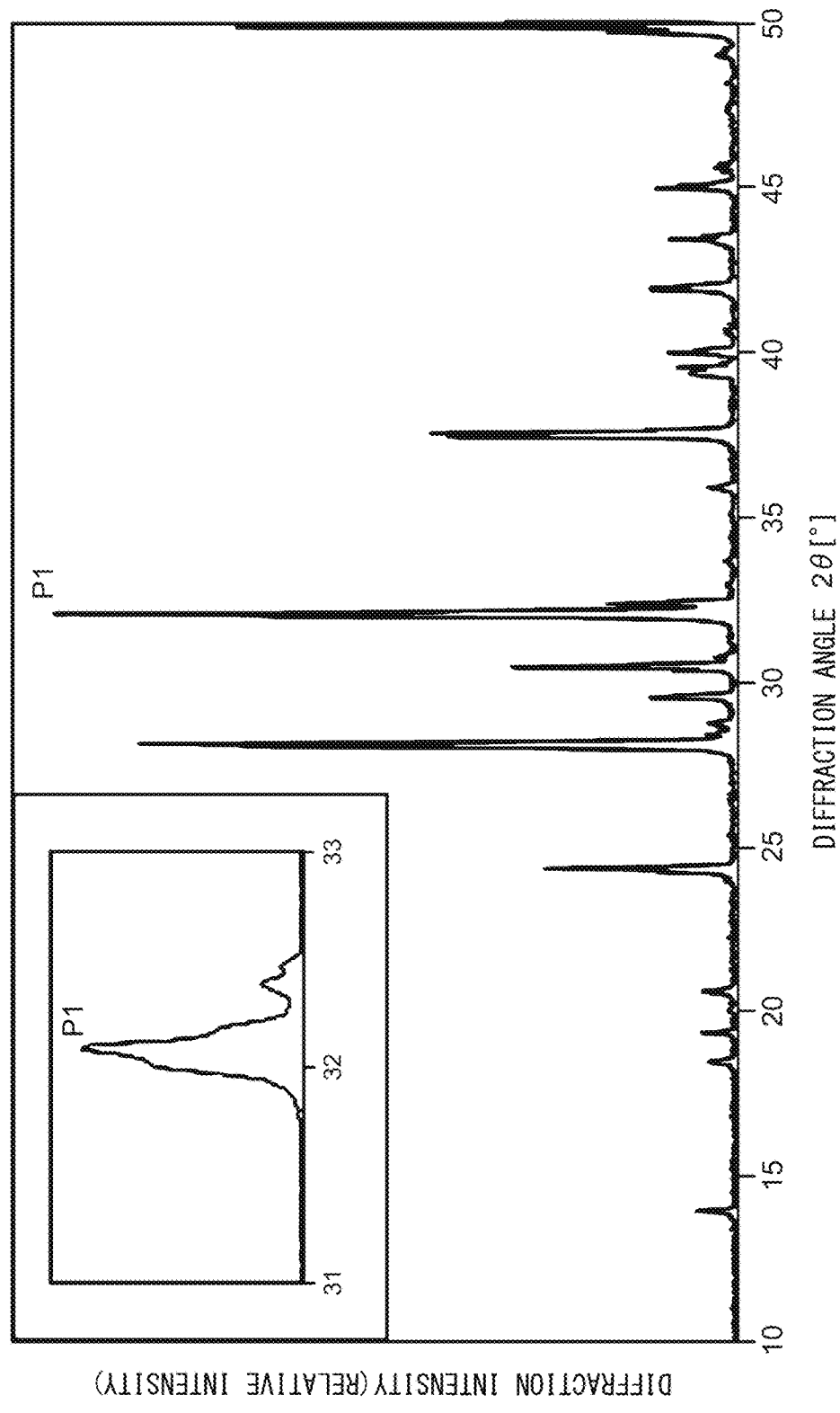
FIG. 7 illustrates an X-ray diffraction pattern of a phosphor according to Example 10.
Figure 8:
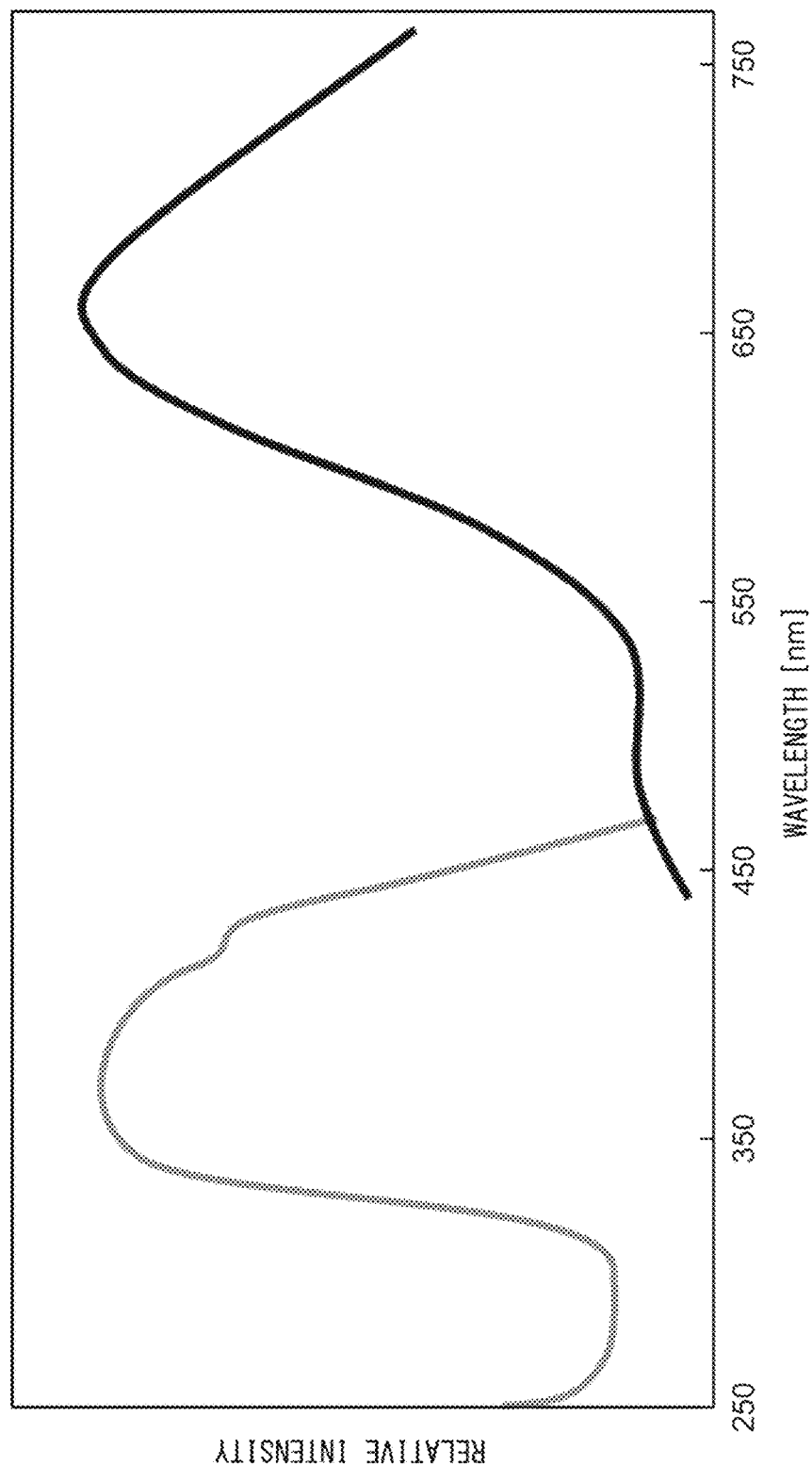
FIG. 8 illustrates an excitation spectrum and an emission spectrum of the phosphor according to Example 10.

A phosphor according to Example 10 is a phosphor represented by $(K_{0.995},Na_{0.005})F \cdot Ca_{0.96}KPO_4:Eu^{2+}_{0.04}$. The phosphor according to Example 10 is manufactured through the following method. First, KF, NaF, and $K_2CO_3$ powders were dried for two hours at 150° C. Then, in a glove box filled with dry $N_2$, KF, $K_2CO_3$, NaF, $CaHPO_4$, $(NH_3)_2HPO_4$, and $Eu_2O_3$ were precisely measured to achieve a stoichiometric ratio of 0.995:0.500:0.005:0.960:0.040:0.020 (mol) and crushed and mixed in an alumina mortar, and a raw material powder mixture was obtained. Processes similar to those in Example 1 were carried out thereafter, and the phosphor according to Example 10 was obtained. FIG. 7 illustrates an X-ray diffraction pattern of the phosphor according to Example 10. FIG. 8 illustrates an excitation spectrum and an emission spectrum of the phosphor according to Example 10.

EXAMPLE 11

A phosphor according to Example 11 is a phosphor represented by $(K_{0.995},Li_{0.005})F \cdot Ca_{0.96}KPO_4:Eu^{2+}_{0.04}$. The phosphor according to Example 11 is manufactured through the following method. First, KF and $K_2CO_3$ powders were dried for two hours at 150° C. Then, in a glove box filled with dry $N_2$, KF, $K_2CO_3$, LiF, $CaHPO_4$, $(NH_3)_2HPO_4$, and $Eu_2O_3$ were precisely measured to achieve a stoichiometric ratio of 0.995:0.500:0.005:0.960:0.040:0.020 (mol) and crushed and mixed in an alumina mortar, and a raw material powder mixture was obtained. Processes similar to those in Example 1 were carried out thereafter, and the phosphor according to Example 11 was obtained.

EXAMPLE 12

A phosphor according to Example 12 is a phosphor represented by $(K_{0.995},Rb_{0.005})F \cdot Ca_{0.96}KPO_4:Eu^{2+}_{0.04}$. The phosphor according to Example 12 is manufactured through the following method. First, KF, RbF, and $K_2CO_3$ powders were dried for two hours at 150° C. Then, in a glove box filled with dry $N_2$, KF, $K_2CO_3$, RbF, $CaHPO_4$, $(NH_3)_2HPO_4$, and $Eu_2O_3$ were precisely measured to achieve a stoichiometric ratio of 0.995:0.500:0.005:0.960:0.040:0.020 (mol) and crushed and mixed in an alumina mortar, and a raw material powder mixture was obtained. Processes similar to those in Example 1 were carried out thereafter, and the phosphor according to Example 12 was obtained.

EXAMPLE 13

A phosphor according to Example 13 is a phosphor represented by $(K_{0.995},Cs_{0.005})F \cdot Ca_{0.96}KPO_4:Eu^{2+}_{0.04}$. The phosphor according to Example 13 is manufactured through the following method. First, KF, CsF, and $K_2CO_3$ powders were dried for two hours at 150° C. Then, in a glove box filled with dry $N_2$, KF, $K_2CO_3$, CsF, $CaHPO_4$, $(NH_3)_2HPO_4$, and $Eu_2O_3$ were precisely measured to achieve a stoichiometric ratio of 0.995:0.500:0.005:0.960:0.040:0.020 (mol) and crushed and mixed in an alumina mortar, and a raw material powder mixture was obtained. Processes similar to those in Example 1 were carried out thereafter, and the phosphor according to Example 13 was obtained.

As shown in Example 10 through Example 13 above, the phosphor that emits red light according to the present embodiment can be obtained even when part of the K ion is replaced with another monovalent metal ion (see Table 2).

EXAMPLE 14

Figure 9:
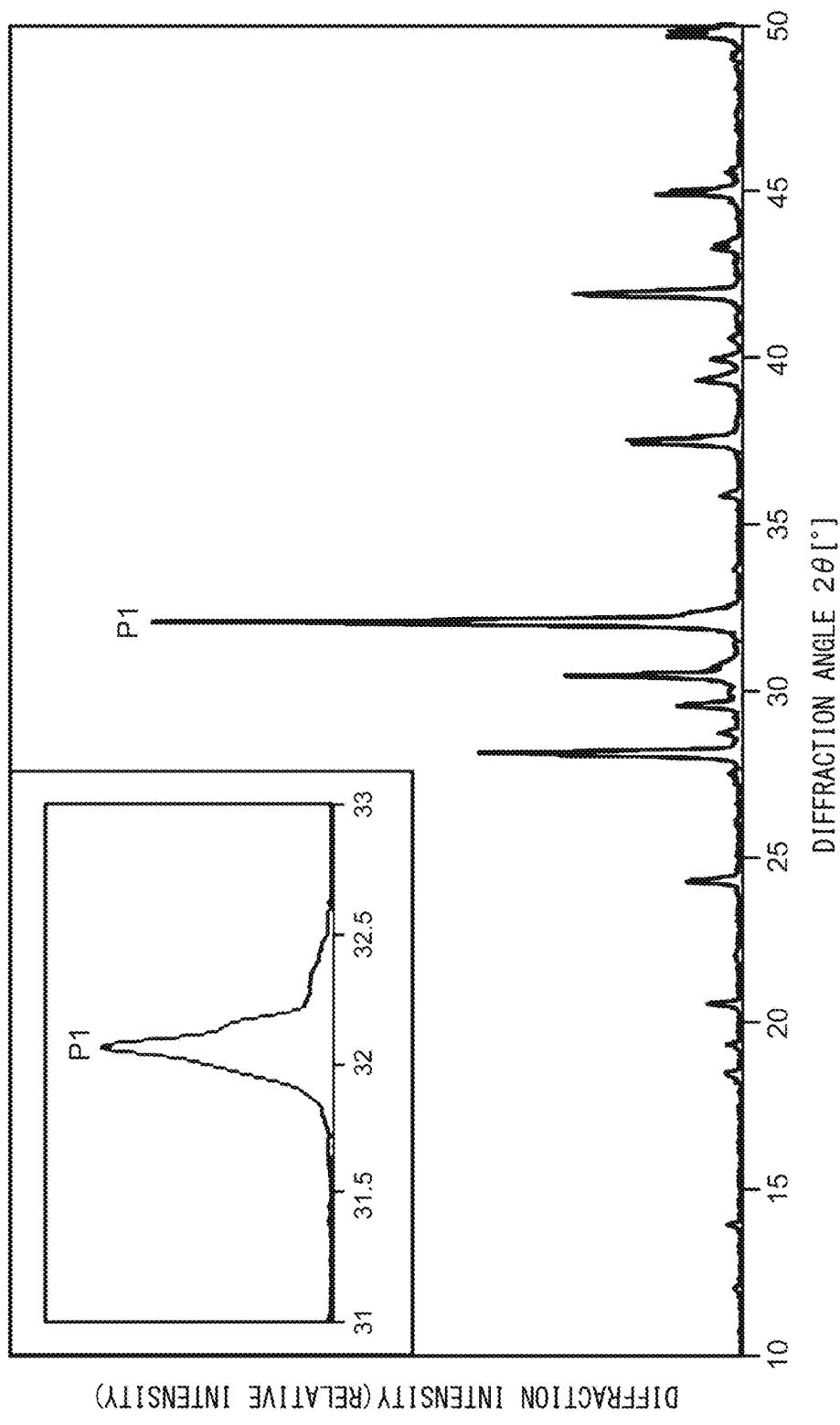
FIG. 9 illustrates an X-ray diffraction pattern of a phosphor according to Example 14.
Figure 10:
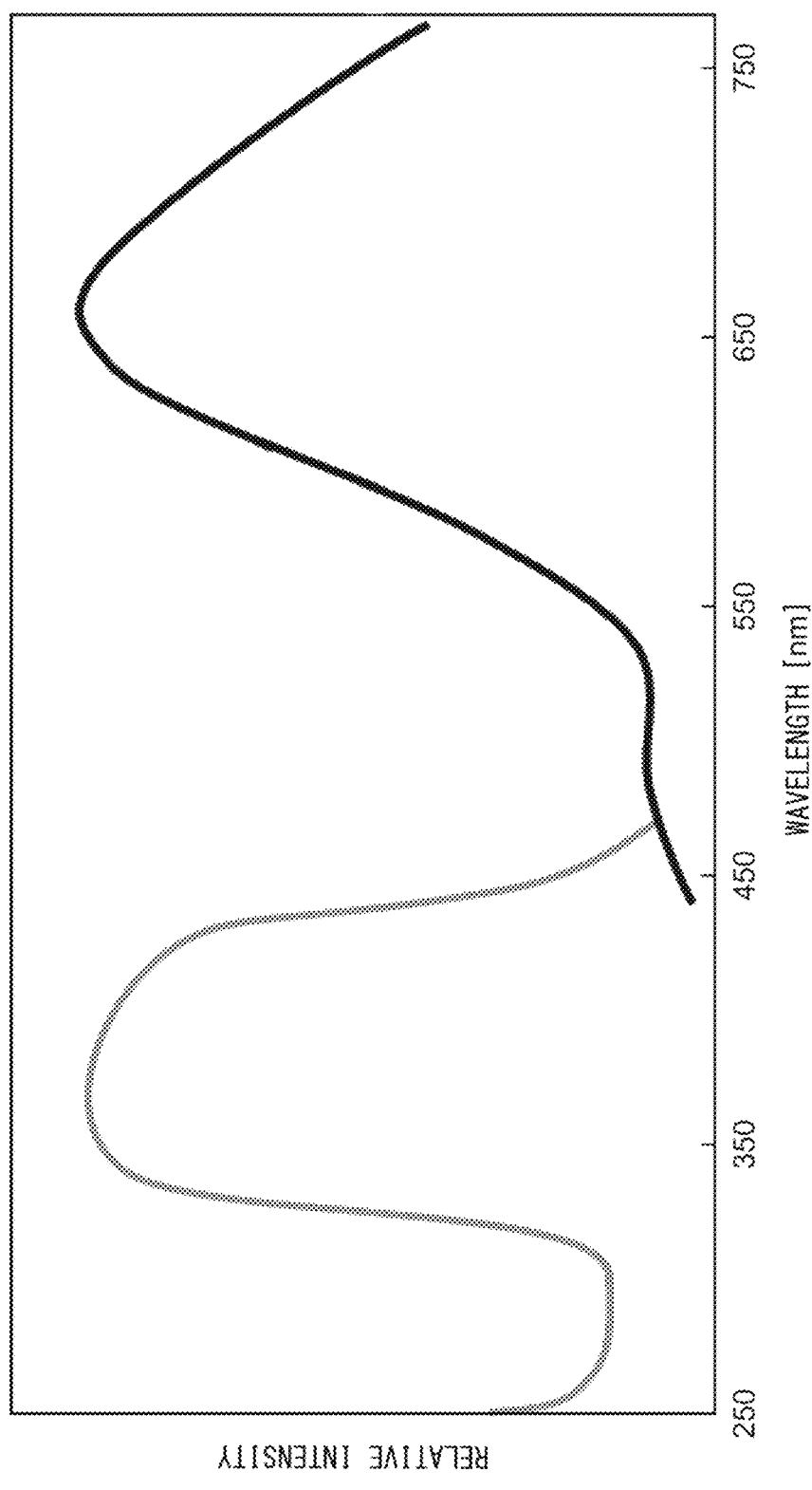
FIG. 10 illustrates an excitation spectrum and an emission spectrum of the phosphor according to Example 14.

A phosphor according to Example 14 is a phosphor represented by $KF \cdot Ca_{0.98}K(P_{0.999},V_{0.001})O_4:Eu^{2+}_{0.02}$. The phosphor according to Example 14 is manufactured through the following method. First, KF and $K_2CO_3$ powders were dried for two hours at 150° C. Then, in a glove box filled with dry $N_2$, KF, $K_2CO_3$, $CaHPO_4$, $V_2O_5$, $(NH_3)_2HPO_4$, and $Eu_2O_3$ were precisely measured to achieve a stoichiometric ratio of 1.000:0.500:0.980:0.001:0.018:0.010 (mol) and crushed and mixed in an alumina mortar, and a raw material powder mixture was obtained. Processes similar to those in Example 1 were carried out thereafter, and the phosphor according to Example 14 was obtained. FIG. 9 illustrates an X-ray diffraction pattern of the phosphor according to Example 14. FIG. 10 illustrates an excitation spectrum and an emission spectrum of the phosphor according to Example 14.

EXAMPLE 15

A phosphor according to Example 15 is a phosphor represented by $KF \cdot Ca_{0.98}K(P_{0.999},Nb_{0.001})O_4:Eu^{2+}_{0.02}$. The phosphor according to Example 15 is manufactured through the following method. First, KF and $K_2CO_3$ powders were dried for two hours at 150° C. Then, in a glove box filled with dry $N_2$, KF, $K_2CO_3$, $CaHPO_4$, $Nb_2O_5$, $(NH_3)_2HPO_4$, and $Eu_2O_3$ were precisely measured to achieve a stoichiometric ratio of 1.000:0.500:0.980:0.001:0.018:0.010 (mol) and crushed and mixed in an alumina mortar, and a raw material powder mixture was obtained. Processes similar to those in Example 1 were carried out thereafter, and the phosphor according to Example 15 was obtained.

EXAMPLE 16

A phosphor according to Example 16 is a phosphor represented by $KF \cdot Ca_{0.98}K(P_{0.999},Ta_{0.001})O_4:Eu^{2+}_{0.02}$. The phosphor according to Example 16 is manufactured through the following method. First, KF and $K_2CO_3$ powders were dried for two hours at 150° C. Then, in a glove box filled with dry $N_2$, KF, $K_2CO_3$, $CaHPO_4$, $Ta_2O_5$, $(NH_3)_2HPO_4$, and $Eu_2O_3$ were precisely measured to achieve a stoichiometric ratio of 1.000:0.500:0.980:0.001:0.018:0.010 (mol) and crushed and mixed in an alumina mortar, and a raw material powder mixture was obtained. Processes similar to those in Example 1 were carried out thereafter, and the phosphor according to Example 16 was obtained.

EXAMPLE 17

A phosphor according to Example 17 is a phosphor represented by $KF \cdot Ca_{0.98}K(P_{0.999},Sb_{0.001})O_4:Eu^{2+}_{0.02}$. The phosphor according to Example 17 is manufactured through the following method. First, KF and $K_2CO_3$ powders were dried for two hours at 150° C. Then, in a glove box filled with dry $N_2$, KF, $K_2CO_3$, $CaHPO_4$, $Sb_2O_5$, $(NH_3)_2HPO_4$, and $Eu_2O_3$ were precisely measured to achieve a stoichiometric ratio of 1.000:0.500:0.980:0.001:0.018:0.010 (mol) and crushed and mixed in an alumina mortar, and a raw material powder mixture was obtained. Processes similar to those in Example 1 were carried out thereafter, and the phosphor according to Example 17 was obtained.

EXAMPLE 18

A phosphor according to Example 18 is a phosphor represented by $KF \cdot Ca_{0.98}K(P_{0.999},Bi_{0.001})O_4:Eu^{2+}_{0.02}$. The phosphor according to Example 18 is manufactured through the following method. First, KF and $K_2CO_3$ powders were dried for two hours at 150° C. Then, in a glove box filled with dry $N_2$, KF, $K_2CO_3$, $CaHPO_4$, $Bi_2O_3$, $(NH_3)_2HPO_4$, and $Eu_2O_3$ were precisely measured to achieve a stoichiometric ratio of 1.000:0.500:0.980:0.001:0.018:0.010 (mol) and crushed and mixed in an alumina mortar, and a raw material powder mixture was obtained. Processes similar to those in Example 1 were carried out thereafter, and the phosphor according to Example 18 was obtained.

EXAMPLE 19

A phosphor according to Example 19 is a phosphor represented by $KF \cdot Ca_{0.98}K_{1.001}(P_{0.999},Si_{0.001})O_4:Eu^{2+}_{0.02}$. The phosphor according to Example 19 is manufactured through the following method. First, KF and $K_2CO_3$ powders were dried for two hours at 150° C. Then, in a glove box filled with dry $N_2$, KF, $K_2CO_3$, $CaHPO_4$, $SiO_2$, $(NH_3)_2HPO_4$, and $Eu_2O_3$ were precisely measured to achieve a stoichiometric ratio of 1.0000:0.5005:0.9800:0.001:0.0180:0.0100 (mol) and crushed and mixed in an alumina mortar, and a raw material powder mixture was obtained. Processes similar to those in Example 1 were carried out thereafter, and the phosphor according to Example 19 was obtained. In the present example, part of the P ion, which is a pentavalent metal ion $M^V$, is replaced with a Si ion, which is a tetravalent metal ion, and the composition of the K ion, which is a monovalent metal ion, is increased in order to balance the valence.

As shown in Example 14 through Example 19 above, the phosphor that emits red light according to the present embodiment can be obtained even when part of the P ion is replaced with another pentavalent metal ion (see Table 2). In addition, part of the P ion may be replaced with a tetravalent metal ion and a monovalent metal ion.

EXAMPLE 20

A phosphor according to Example 20 is a phosphor represented by $KF \cdot Ca_{0.97}K_{0.999}PO_4:Eu^{2+}_{0.029},Sc^{3+}_{0.001}$. The phosphor according to Example 20 is manufactured through the following method. First, KF and $K_2CO_3$ powders were dried for two hours at 150° C. Then, in a glove box filled with dry $N_2$, KF, $K_2CO_3$, $CaHPO_4$, $(NH_3)_2HPO_4$, $Eu_2O_3$, and $Sc_2O_3$ were precisely measured to achieve a stoichiometric ratio of 1.0000:0.4995:0.9700:0.0300:0.0145:0.0005 (mol) and crushed and mixed in an alumina mortar, and a raw material powder mixture was obtained. Processes similar to those in Example 1 were carried out thereafter, and the phosphor according to Example 20 was obtained.

EXAMPLE 21

A phosphor according to Example 21 is a phosphor represented by $KF \cdot Ca_{0.97}K_{0.999}PO_4:Eu^{2+}_{0.029},Y^{3+}_{0.001}$. The phosphor according to Example 21 is manufactured through the following method. First, KF and $K_2CO_3$ powders were dried for two hours at 150° C. Then, in a glove box filled with dry $N_2$, KF, $K_2CO_3$, $CaHPO_4$, $(NH_3)_2HPO_4$, $Eu_2O_3$, and $Y_2O_3$ were precisely measured to achieve a stoichiometric ratio of 1.0000:0.4995:0.9700:0.0300:0.0145:0.0005 (mol) and crushed and mixed in an alumina mortar, and a raw material powder mixture was obtained. Processes similar to those in Example 1 were carried out thereafter, and the phosphor according to Example 21 was obtained.

EXAMPLE 22

A phosphor according to Example 22 is a phosphor represented by $KF \cdot Ca_{0.97}K_{0.999}PO_4:Eu^{2+}_{0.029},La^{3+}_{0.001}$. The phosphor according to Example 22 is manufactured through the following method. First, KF and $K_2CO_3$ powders were dried for two hours at 150° C. Then, in a glove box filled with dry $N_2$, KF, $K_2CO_3$, $CaHPO_4$, $(NH_3)_2HPO_4$, $Eu_2O_3$, and $La_2O_3$ were precisely measured to achieve a stoichiometric ratio of 1.0000:0.4995:0.9700:0.0300:0.0145:0.0005 (mol) and crushed and mixed in an alumina mortar, and a raw material powder mixture was obtained. Processes similar to those in Example 1 were carried out thereafter, and the phosphor according to Example 22 was obtained.

EXAMPLE 23

A phosphor according to Example 23 is a phosphor represented by $KF \cdot Ca_{0.97}K_{0.999}PO_4:Eu^{2+}_{0.029},Pr^{3+}_{0.001}$. The phosphor according to Example 23 is manufactured through the following method. First, KF and $K_2CO_3$ powders were dried for two hours at 150° C. Then, in a glove box filled with dry $N_2$, KF, $K_2CO_3$, $CaHPO_4$, $(NH_3)_2HPO_4$, $Eu_2O_3$, and $Pr_2O_3$ were precisely measured to achieve a stoichiometric ratio of 1.0000:0.4995:0.9700:0.0300:0.0145:0.0005 (mol) and crushed and mixed in an alumina mortar, and a raw material powder mixture was obtained. Processes similar to those in Example 1 were carried out thereafter, and the phosphor according to Example 23 was obtained.

EXAMPLE 24

A phosphor according to Example 24 is a phosphor represented by $KF \cdot Ca_{0.97}K_{0.999}PO_4:Eu^{2+}_{0.029},Nd^{3+}_{0.001}$. The phosphor according to Example 24 is manufactured through the following method. First, KF and $K_2CO_3$ powders were dried for two hours at 150° C. Then, in a glove box filled with dry $N_2$, KF, $K_2CO_3$, $CaHPO_4$, $(NH_3)_2HPO_4$, $Eu_2O_3$, and $Nd_2O_3$ were precisely measured to achieve a stoichiometric ratio of 1.0000:0.4995:0.9700:0.0300:0.0145:0.0005 (mol) and crushed and mixed in an alumina mortar, and a raw material powder mixture was obtained.

Processes similar to those in Example 1 were carried out thereafter, and the phosphor according to Example 24 was obtained.

EXAMPLE 25

A phosphor according to Example 25 is a phosphor represented by $KF\cdot Ca_{0.97}K_{0.999}PO_4:Eu^{2+}{}_{0.029},Sm^{3+}{}_{0.001}$. The phosphor according to Example 25 is manufactured through the following method. First, KF and $K_2CO_3$ powders were dried for two hours at 150° C. Then, in a glove box filled with dry $N_2$, KF, $K_2CO_3$, $CaHPO_4$, $(NH_3)_2HPO_4$, $Eu_2O_3$, and $Sm_2O_3$ were precisely measured to achieve a stoichiometric ratio of 1.0000:0.4995:0.9700:0.0300: 0.0145:0.0005 (mol) and crushed and mixed in an alumina mortar, and a raw material powder mixture was obtained. Processes similar to those in Example 1 were carried out thereafter, and the phosphor according to Example 25 was obtained.

EXAMPLE 26

A phosphor according to Example 26 is a phosphor represented by $KF\cdot Ca_{0.97}K_{0.999}PO_4:Eu^{2+}{}_{0.029},Gd^{3+}{}_{0.001}$. The phosphor according to Example 26 is manufactured through the following method. First, KF and $K_2CO_3$ powders were dried for two hours at 150° C. Then, in a glove box filled with dry $N_2$, KF, $K_2CO_3$, $CaHPO_4$, $(NH_3)_2HPO_4$, $Eu_2O_3$, and $Gd_2O_3$ were precisely measured to achieve a stoichiometric ratio of 1.0000:0.4995:0.9700:0.030:0.0145: 0.0005 (mol) and crushed and mixed in an alumina mortar, and a raw material powder mixture was obtained. Processes similar to those in Example 1 were carried out thereafter, and the phosphor according to Example 26 was obtained.

EXAMPLE 27

A phosphor according to Example 27 is a phosphor represented by $KF\cdot Ca_{0.97}K_{0.999}PO_4:Eu^{2+}{}_{0.029},Tb^{3+}{}_{0.001}$. The phosphor according to Example 27 is manufactured through the following method. First, KF and $K_2CO_3$ powders were dried for two hours at 150° C. Then, in a glove box filled with dry $N_2$, KF, $K_2CO_3$, $CaHPO_4$, $(NH_3)_2HPO_4$, $Eu_2O_3$, and $Tb_4O_7$ were precisely measured to achieve a stoichiometric ratio of 1.0000:0.4995:0.9700:0.0300:0.0145:0.0005 (mol) and crushed and mixed in an alumina mortar, and a raw material powder mixture was obtained. Processes similar to those in Example 1 were carried out thereafter, and the phosphor according to Example 27 was obtained.

EXAMPLE 28

A phosphor according to Example 28 is a phosphor represented by $KF\cdot Ca_{0.97}K_{0.999}PO_4:Eu^{2+}{}_{0.029},Dy^{3+}{}_{0.001}$. The phosphor according to Example 28 is manufactured through the following method. First, KF and $K_2CO_3$ powders were dried for two hours at 150° C. Then, in a glove box filled with dry $N_2$, KF, $K_2CO_3$, $CaHPO_4$, $(NH_3)_2HPO_4$, $Eu_2O_3$, and $Dy_2O_3$ were precisely measured to achieve a stoichiometric ratio of 1.0000:0.4995:0.9700:0.030:0.0145: 0.0005 (mol) and crushed and mixed in an alumina mortar, and a raw material powder mixture was obtained. Processes similar to those in Example 1 were carried out thereafter, and the phosphor according to Example 28 was obtained.

EXAMPLE 29

A phosphor according to Example 29 is a phosphor represented by $KF\cdot Ca_{0.97}K_{0.999}PO_4:Eu^{2+}{}_{0.029},Ho^{3+}{}_{0.001}$. The phosphor according to Example 29 is manufactured through the following method. First, KF and $K_2CO_3$ powders were dried for two hours at 150° C. Then, in a glove box filled with dry $N_2$, KF, $K_2CO_3$, $CaHPO_4$, $(NH_3)_2HPO_4$, $Eu_2O_3$, and $Ho_2O_3$ were precisely measured to achieve a stoichiometric ratio of 1.0000:0.4995:0.9700:0.030:0.0145: 0.0005 (mol) and crushed and mixed in an alumina mortar, and a raw material powder mixture was obtained. Processes similar to those in Example 1 were carried out thereafter, and the phosphor according to Example 29 was obtained.

EXAMPLE 30

A phosphor according to Example 30 is a phosphor represented by $KF\cdot Ca_{0.97}K_{0.999}PO_4:Eu^{2+}{}_{0.029},Er^{3+}{}_{0.001}$. The phosphor according to Example 30 is manufactured through the following method. First, KF and $K_2CO_3$ powders were dried for two hours at 150° C. Then, in a glove box filled with dry $N_2$, KF, $K_2CO_3$, $CaHPO_4$, $(NH_3)_2HPO_4$, $Eu_2O_3$, and $Er_2O_3$ were precisely measured to achieve a stoichiometric ratio of 1.0000:0.4995:0.9700:0.030:0.0145:0.0005 (mol) and crushed and mixed in an alumina mortar, and a raw material powder mixture was obtained. Processes similar to those in Example 1 were carried out thereafter, and the phosphor according to Example 30 was obtained.

EXAMPLE 31

Figure 11:
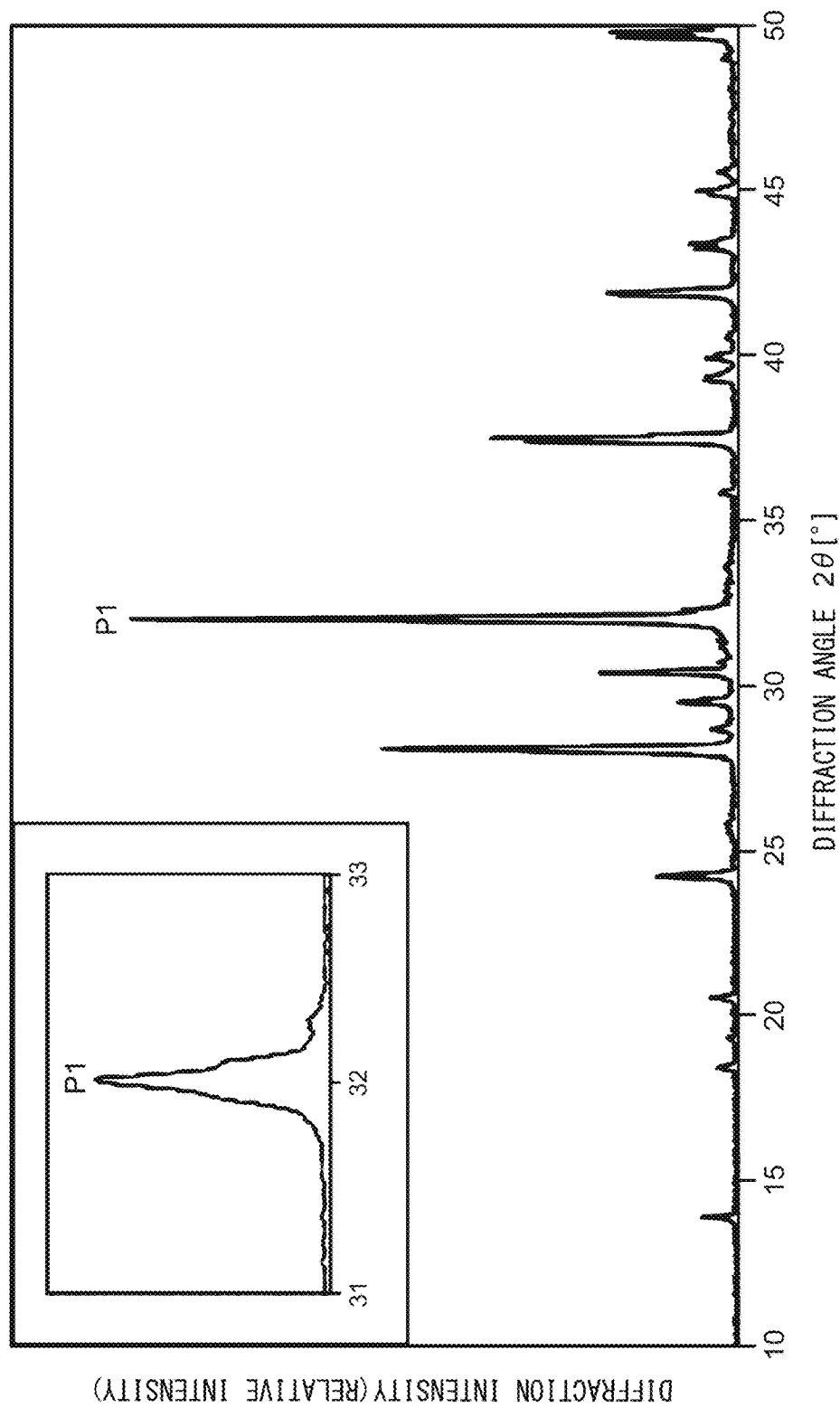
FIG. 11 illustrates an X-ray diffraction pattern of a phosphor according to Example 31.
Figure 12:
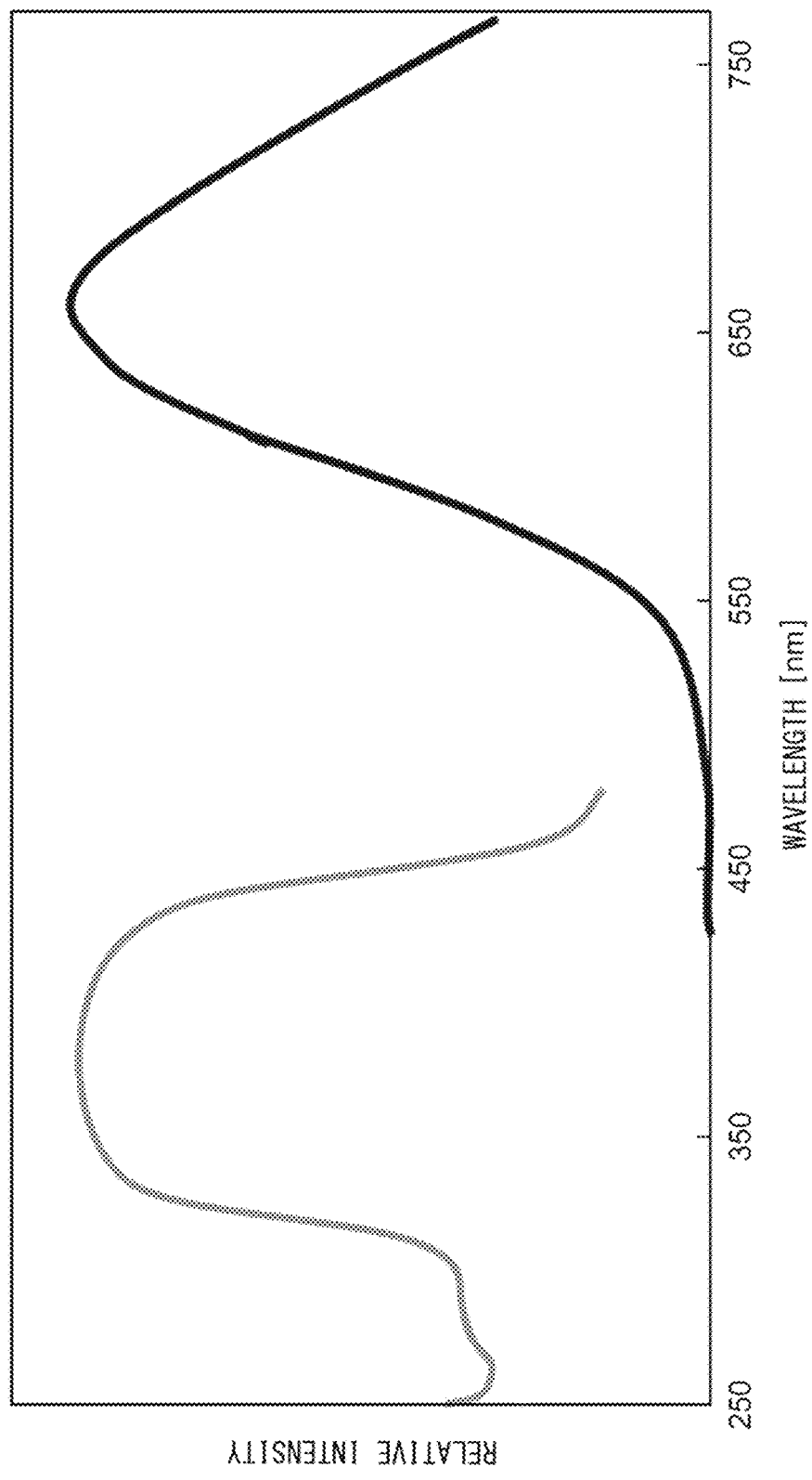
FIG. 12 illustrates an excitation spectrum and an emission spectrum of the phosphor according to Example 31.

A phosphor according to Example 31 is a phosphor represented by $KF\cdot Ca_{0.97}KPO_4:Eu^{2+}{}_{0.029},Yb^{2+}{}_{0.001}$. The phosphor according to Example 31 is manufactured through the following method. First, KF and $K_2CO_3$ powders were dried for two hours at 150° C. Then, in a glove box filled with dry $N_2$, KF, $K_2CO_3$, $CaHPO_4$, $(NH_3)_2HPO_4$, $Eu_2O_3$, and $Yb_2O_3$ were precisely measured to achieve a stoichiometric ratio of 1.0000:0.5000:0.9700:0.030:0.0145:0.0005 (mol) and crushed and mixed in an alumina mortar, and a raw material powder mixture was obtained. Processes similar to those in Example 1 were carried out thereafter, and the phosphor according to Example 31 was obtained. FIG. 11 illustrates an X-ray diffraction pattern of the phosphor according to Example 31. FIG. 12 illustrates an excitation spectrum and an emission spectrum of the phosphor according to Example 31.

EXAMPLE 32

A phosphor according to Example 32 is a phosphor represented by $KF\cdot Ca_{0.97}K_{0.999}PO_4:Eu^{2+}{}_{0.029},Lu^{3+}{}_{0.001}$. The phosphor according to Example 32 is manufactured through the following method. First, KF and $K_2CO_3$ powders were dried for two hours at 150° C. Then, in a glove box filled with dry $N_2$, KF, $K_2CO_3$, $CaHPO_4$, $(NH_3)_2HPO_4$, $Eu_2O_3$, and $Lu_2O_3$ were precisely measured to achieve a stoichiometric ratio of 1.0000:0.4995:0.9700:0.030:0.0145:0.0005 (mol) and crushed and mixed in an alumina mortar, and a raw material powder mixture was obtained. Processes similar to those in Example 1 were carried out thereafter, and the phosphor according to Example 32 was obtained.

As shown in Example 20 through Example 32 above, the phosphor that emits red light according to the present embodiment can be obtained even when part of the $Eu^{2+}$ ion is replaced with another rare earth element (see Table 2).

EXAMPLE 33

A phosphor according to Example 33 is a phosphor represented by $0.65KF\cdot Ca_{0.99}KPO_4:Eu^{2+}{}_{0.01}$. The phosphor according to Example 33 is manufactured through the following method. First, KF and $K_2CO_3$ powders were dried for two hours at 150° C. Then, in a glove box filled with dry $N_2$, KF, $K_2CO_3$, $CaHPO_4$, $(NH_3)_2HPO_4$, and $Eu_2O_3$ were precisely measured to achieve a stoichiometric ratio of 0.650:0.500:0.990:0.010:0.005 (mol) and crushed and mixed in an alumina mortar, and a raw material powder mixture was obtained. Processes similar to those in Example 1 were carried out thereafter, and the phosphor according to Example 33 was obtained.

EXAMPLE 34

A phosphor according to Example 34 is a phosphor represented by $1.35KF \cdot Ca_{0.99}KPO_4:Eu^{2+}_{0.01}$. The phosphor according to Example 34 is manufactured through the following method. First, KF and $K_2CO_3$ powders were dried for two hours at 150° C. Then, in a glove box filled with dry $N_2$, KF, $K_2CO_3$, $CaHPO_4$, $(NH_3)_2HPO_4$, and $Eu_2O_3$ were precisely measured to achieve a stoichiometric ratio of 1.350:0.500:0.990:0.010:0.005 (mol) and crushed and mixed in an alumina mortar, and a raw material powder mixture was obtained. Processes similar to those in Example 1 were carried out thereafter, and the phosphor according to Example 34 was obtained.

As shown in Example 33 and Example 34 above, the phosphor that emits red light according to the present embodiment can be obtained as long as a falls within a range of $0.6 \leq a \leq 1.4$ in the general formula.

The compositions of the phosphors according to Examples 1 through 34 described above are summarized in Table 3.

TABLE 3

$aM^IX \cdot M^{II}_{1-x}M^IM^VO_4:(Re)_x$

| | | $aM^IX$ | | | $M^{II}_{1-x}M^IM^VO_4$ | | | |
|---|---|---|---|---|---|---|---|---|
| EXAMPLE | a | $M^I$ | | X | | $M^{II}$ | | 1 − x |
| 1 | 1 | K = 1 | | F = 1 | | Ca = 0.99 | | | 0.99 |
| 2 | 1 | K = 1 | | F = 1 | | Ca = 0.97 | Sr = 0.01 | | 0.98 |
| 3 | 1 | K = 1 | | F = 1 | | Ca = 0.982 | Ba = 0.005 | Mg = 0.005 | 0.992 |
| 4 | 1 | K = 1 | | F = 1 | | Ca = 0.96 | Sn = 0.005 | Zn = 0.005 | 0.97 |
| 5 | 1 | K = 1 | | F = 1 | | Ca = 0.985 | Mn = 0.005 | | 0.99 |
| 6 | 1 | K = 1 | | F = 1 | | Ca = 0.795 | Cd = 0.005 | | 0.8 |
| 7 | 1 | K = 1 | | F = 0.995 | Cl = 0.005 | Ca = 0.99 | | | 0.99 |
| 8 | 1 | K = 1 | | F = 0.995 | Br = 0.005 | Ca = 0.95 | | | 0.95 |
| 9 | 1 | K = 1 | | F = 0.995 | I = 0.005 | Ca = 0.96 | | | 0.96 |
| 10 | 1 | K = 0.995 | Na = 0.005 | F = 1 | | Ca = 0.96 | | | 0.96 |
| 11 | 1 | K = 0.995 | Li = 0.005 | F = 1 | | Ca = 0.96 | | | 0.96 |
| 12 | 1 | K = 0.995 | Rb = 0.005 | F = 1 | | Ca = 0.96 | | | 0.96 |
| 13 | 1 | K = 0.995 | Cs = 0.005 | F = 1 | | Ca = 0.96 | | | 0.96 |
| 14 | 1 | K = 1 | | F = 1 | | Ca = 0.98 | | | 0.98 |
| 15 | 1 | K = 1 | | F = 1 | | Ca = 0.98 | | | 0.98 |
| 16 | 1 | K = 1 | | F = 1 | | Ca = 0.98 | | | 0.98 |
| 17 | 1 | K = 1 | | F = 1 | | Ca = 0.98 | | | 0.98 |
| 18 | 1 | K = 1 | | F = 1 | | Ca = 0.98 | | | 0.98 |
| 19 | 1 | K = 1 | | F = 1 | | Ca = 0.98 | | | 0.98 |
| 20 | 1 | K = 1 | | F = 1 | | Ca = 0.97 | | | 0.97 |
| 21 | 1 | K = 1 | | F = 1 | | Ca = 0.97 | | | 0.97 |
| 22 | 1 | K = 1 | | F = 1 | | Ca = 0.97 | | | 0.97 |
| 23 | 1 | K = 1 | | F = 1 | | Ca = 0.97 | | | 0.97 |
| 24 | 1 | K = 1 | | F = 1 | | Ca = 0.97 | | | 0.97 |
| 25 | 1 | K = 1 | | F = 1 | | Ca = 0.97 | | | 0.97 |
| 26 | 1 | K = 1 | | F = 1 | | Ca = 0.97 | | | 0.97 |
| 27 | 1 | K = 1 | | F = 1 | | Ca = 0.97 | | | 0.97 |
| 28 | 1 | K = 1 | | F = 1 | | Ca = 0.97 | | | 0.97 |
| 29 | 1 | K = 1 | | F = 1 | | Ca = 0.97 | | | 0.97 |
| 30 | 1 | K = 1 | | F = 1 | | Ca = 0.97 | | | 0.97 |
| 31 | 1 | K = 1 | | F = 1 | | Ca = 0.97 | | | 0.97 |
| 32 | 1 | K = 1 | | F = 1 | | Ca = 0.97 | | | 0.97 |
| 33 | 0.65 | K = 1 | | F = 1 | | Ca = 0.99 | | | 0.99 |
| 34 | 1.35 | K = 1 | | F = 1 | | Ca = 0.99 | | | 0.99 |

$aM^IX \cdot M^{II}_{1-x}M^IM^VO_4:(Re)_x$

| | $M^{II}_{1-x}M^IM^VO_4$ | | | $(Re)_x$ | |
|---|---|---|---|---|---|
| EXAMPLE | $M^I$ | $M^V$ | $(M^{IV})$ | Re | x |
| 1 | K = 1 | P = 1 | | $Eu^{2+}$ = 0.01 | 0.01 |
| 2 | K = 1 | P = 1 | | $Eu^{2+}$ = 0.02 | 0.02 |
| 3 | K = 1 | P = 1 | | $Eu^{2+}$ = 0.008 | 0.008 |
| 4 | K = 1 | P = 1 | | $Eu^{2+}$ = 0.02 | 0.03 |
| 5 | K = 1 | P = 1 | | $Eu^{2+}$ = 0.01 | 0.01 |
| 6 | K = 1 | P = 1 | | $Eu^{2+}$ = 0.2 | 0.2 |
| 7 | K = 1 | P = 1 | | $Eu^{2+}$ = 0.01 | 0.01 |
| 8 | K = 1 | P = 1 | | $Eu^{2+}$ = 0.05 | 0.05 |
| 9 | K = 1 | P = 1 | | $Eu^{2+}$ = 0.04 | 0.04 |
| 10 | K = 1 | P = 1 | | $Eu^{2+}$ = 0.04 | 0.04 |
| 11 | K = 1 | P = 1 | | $Eu^{2+}$ = 0.04 | 0.04 |
| 12 | K = 1 | P = 1 | | $Eu^{2+}$ = 0.04 | 0.04 |

TABLE 3-continued

| | | | | | |
|---|---|---|---|---|---|
| 13 | K = 1 | P = 1 | | $Eu^{2+}$ = 0.04 | 0.04 |
| 14 | K = 1 | P = 0.999 | V = 0.001 | $Eu^{2+}$ = 0.02 | 0.02 |
| 15 | K = 1 | P = 0.999 | Nb = 0.001 | $Eu^{2+}$ = 0.02 | 0.02 |
| 16 | K = 1 | P = 0.999 | Ta = 0.001 | $Eu^{2+}$ = 0.02 | 0.02 |
| 17 | K = 1 | P = 0.999 | Sb = 0.001 | $Eu^{2+}$ = 0.02 | 0.02 |
| 18 | K = 1 | P = 0.999 | Bi = 0.001 | $Eu^{2+}$ = 0.02 | 0.02 |
| 19 | K = 1.001 | P = 0.999 | Si = 0.001 | $Eu^{2+}$ = 0.02 | 0.02 |
| 20 | K = 0.999 | P = 1 | | $Eu^{2+}$ = 0.029  $Sc^{3+}$ = 0.001 | 0.03 |
| 21 | K = 0.999 | P = 1 | | $Eu^{2+}$ = 0.029  $Y^{3+}$ = 0.001 | 0.03 |
| 22 | K = 0.999 | P = 1 | | $Eu^{2+}$ = 0.029  $La^{3+}$ = 0.001 | 0.03 |
| 23 | K = 0.999 | P = 1 | | $Eu^{2+}$ = 0.029  $Pr^{3+}$ = 0.001 | 0.03 |
| 24 | K = 0.999 | P = 1 | | $Eu^{2+}$ = 0.029  $Nd^{3+}$ = 0.001 | 0.03 |
| 25 | K = 0.999 | P = 1 | | $Eu^{2+}$ = 0.029  $Sm^{3+}$ = 0.001 | 0.03 |
| 26 | K = 0.999 | P = 1 | | $Eu^{2+}$ = 0.029  $Gd^{3+}$ = 0.001 | 0.03 |
| 27 | K = 0.999 | P = 1 | | $Eu^{2+}$ = 0.029  $Tb^{3+}$ = 0.001 | 0.03 |
| 28 | K = 0.999 | P = 1 | | $Eu^{2+}$ = 0.029  $Dy^{3+}$ = 0.001 | 0.03 |
| 29 | K = 0.999 | P = 1 | | $Eu^{2+}$ = 0.029  $Ho^{3+}$ = 0.001 | 0.03 |
| 30 | K = 0.999 | P = 1 | | $Eu^{2+}$ = 0.029  $Er^{3+}$ = 0.001 | 0.03 |
| 31 | K = 1 | P = 1 | | $Eu^{2+}$ = 0.029  $Yb^{2+}$ = 0.001 | 0.03 |
| 32 | K = 0.999 | P = 1 | | $Eu^{2+}$ = 0.029  $Lu^{3+}$ = 0.001 | 0.03 |
| 33 | K = 1 | P = 1 | | $Eu^{2+}$ = 0.01 | 0.01 |
| 34 | K = 1 | P = 1 | | $Eu^{2+}$ = 0.01 | 0.01 |

EXAMPLE 35

Figure 13:
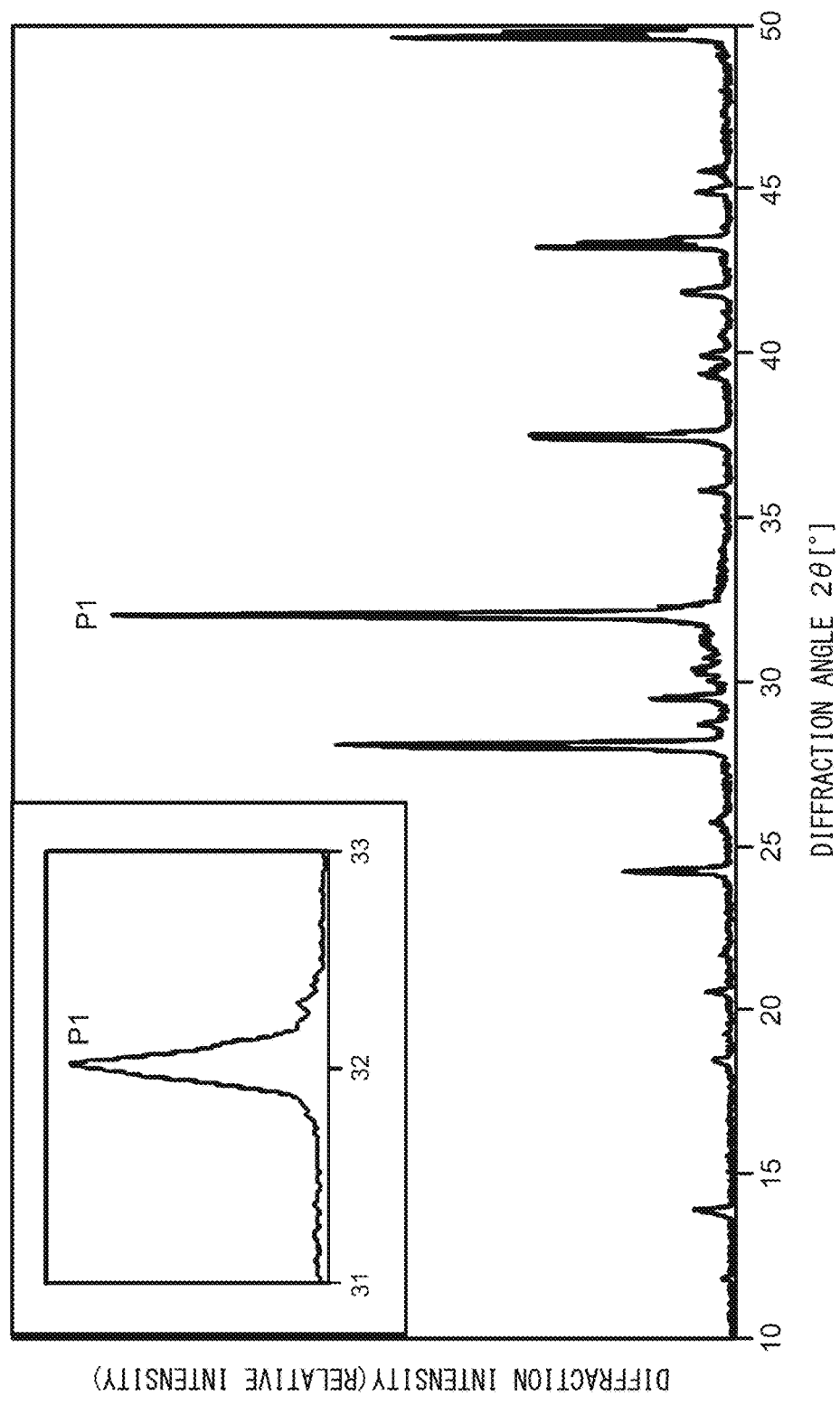
FIG. 13 illustrates an X-ray diffraction pattern of a phosphor according to Example 35.
Figure 14:
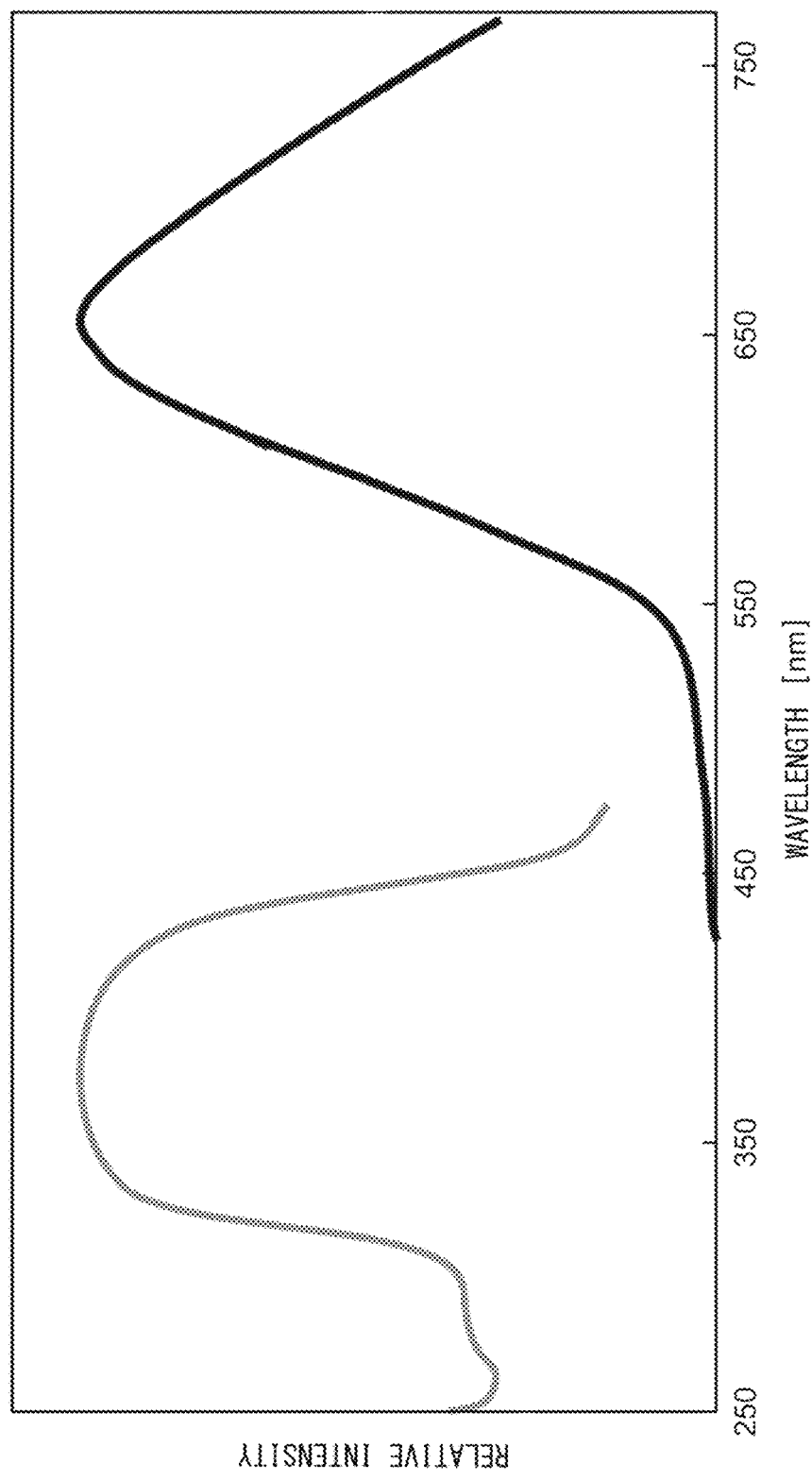
FIG. 14 illustrates an excitation spectrum and an emission spectrum of the phosphor according to Example 35.

A phosphor according to Example 35 is a phosphor represented by $KF \cdot Ca_{0.97}K_{0.999}PO_4:Eu^{2+}_{0.029},Ce^{3+}_{0.001}$. The phosphor according to Example 35 is manufactured through the following method. First, KF and $K_2CO_3$ powders were dried for two hours at 150° C. Then, in a glove box filled with dry $N_2$, KF, $K_2CO_3$, $CaHPO_4$, $(NH_3)_2HPO_4$, $Eu_2O_3$, and $CeO_2$ were precisely measured to achieve a stoichiometric ratio of 1.0000:0.4995:0.9700:0.0300:0.0145:0.001 (mol) and crushed and mixed in an alumina mortar, and a raw material powder mixture was obtained. Processes similar to those in Example 1 were carried out thereafter, and the phosphor according to Example 35 was obtained. FIG. 13 illustrates an X-ray diffraction pattern of the phosphor according to Example 35. FIG. 14 illustrates an excitation spectrum and an emission spectrum of the phosphor according to Example 35.

Examples 36 through 40 described hereinafter are examples in which the amount of part of the Ca ion that is replaced with another divalent metal ion ($M^{II}$=Sr, Ba, Mg) (solid solution amount) or the amount of part of the K ion that is replaced with another monovalent metal ion ($M^{I}$=Li, Ag) is increased as compared to that of Examples 2 through 6.

EXAMPLE 36

Figure 15:
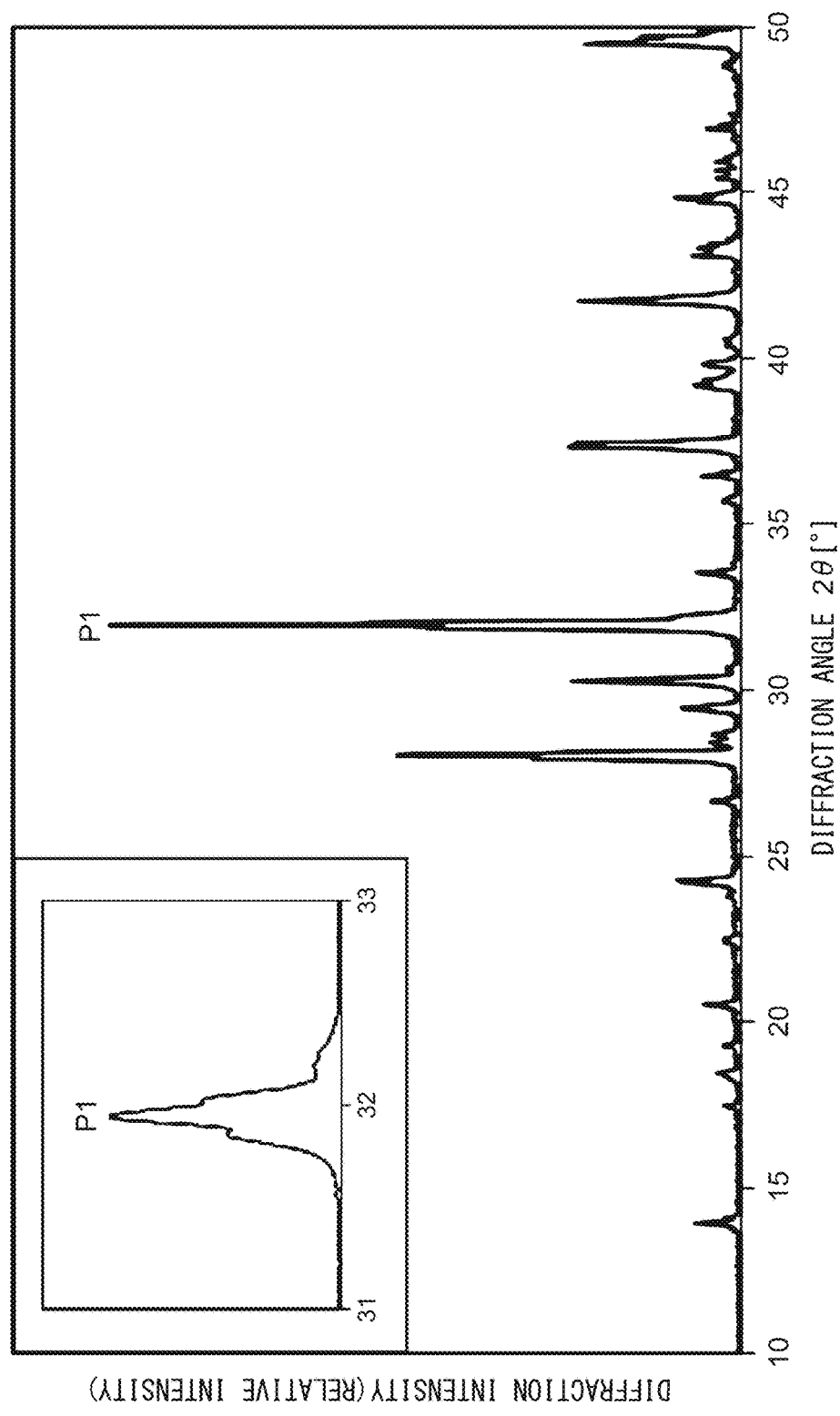
FIG. 15 illustrates an X-ray diffraction pattern of a phosphor according to Example 36.
Figure 16:
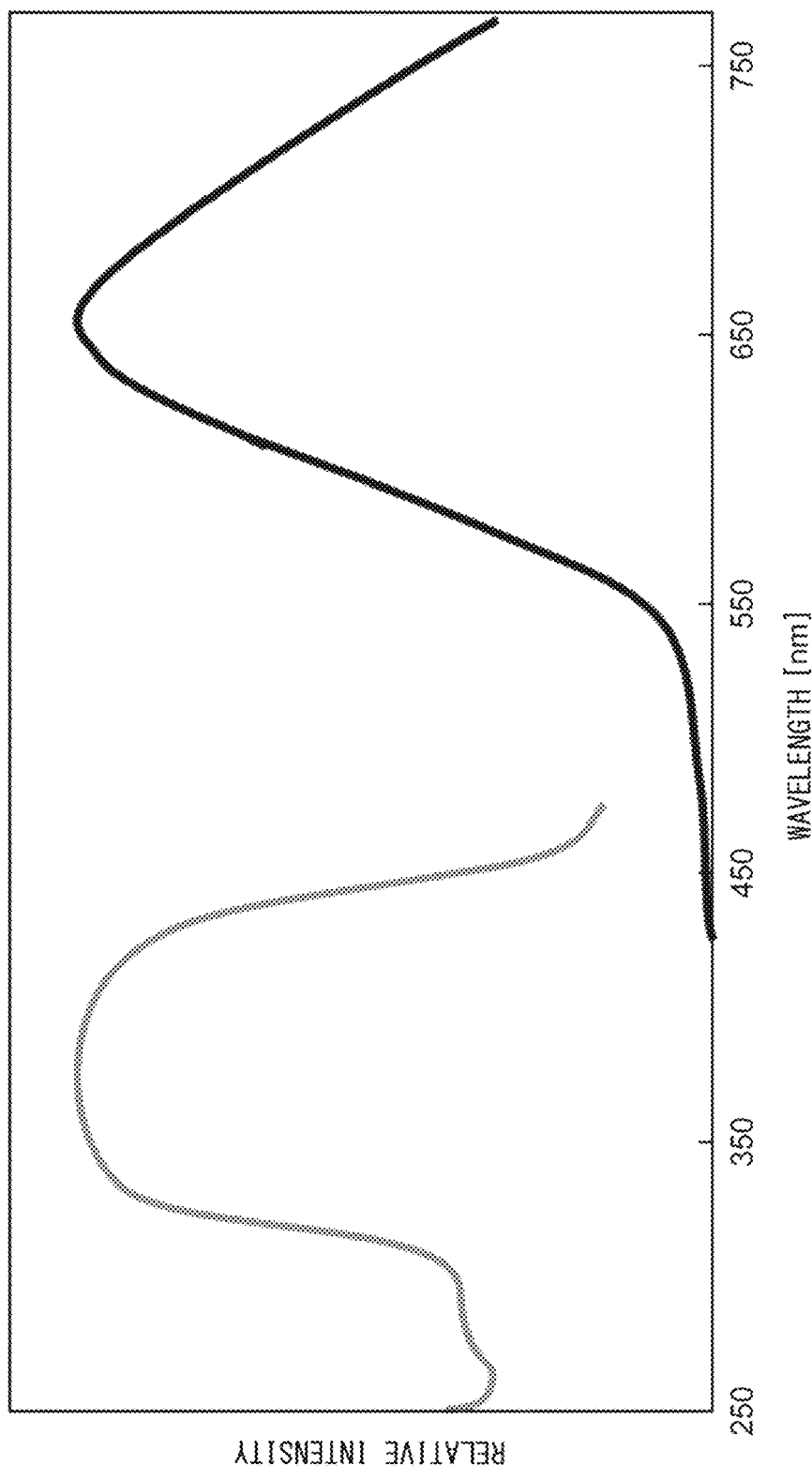
FIG. 16 illustrates an excitation spectrum and an emission spectrum of the phosphor according to Example 36.

A phosphor according to Example 36 is a phosphor represented by $KF \cdot (Ca_{0.79},Sr_{0.200})KPO_4:Eu^{2+}_{0.01}$. In other words, the solid solution amount of Sr is 0.2 mol. The phosphor according to Example 36 is manufactured through the following method. First, KF and $K_2CO_3$ powders were dried for two hours at 150° C. Then, in a glove box filled with dry $N_2$, KF, $K_2CO_3$, $CaHPO_4$, $SrCO_3$, $(NH_3)_2HPO_4$, and $Eu_2O_3$ were precisely measured to achieve a stoichiometric ratio of 1.00:0.50:0.79:0.20:0.21:0.005 (mol) and crushed and mixed in an alumina mortar, and a raw material powder mixture was obtained. Processes similar to those in Example 1 were carried out thereafter, and the phosphor according to Example 36 was obtained. FIG. 15 illustrates an X-ray diffraction pattern of the phosphor according to Example 36. FIG. 16 illustrates an excitation spectrum and an emission spectrum of the phosphor according to Example 36.

EXAMPLE 37

Figure 17:
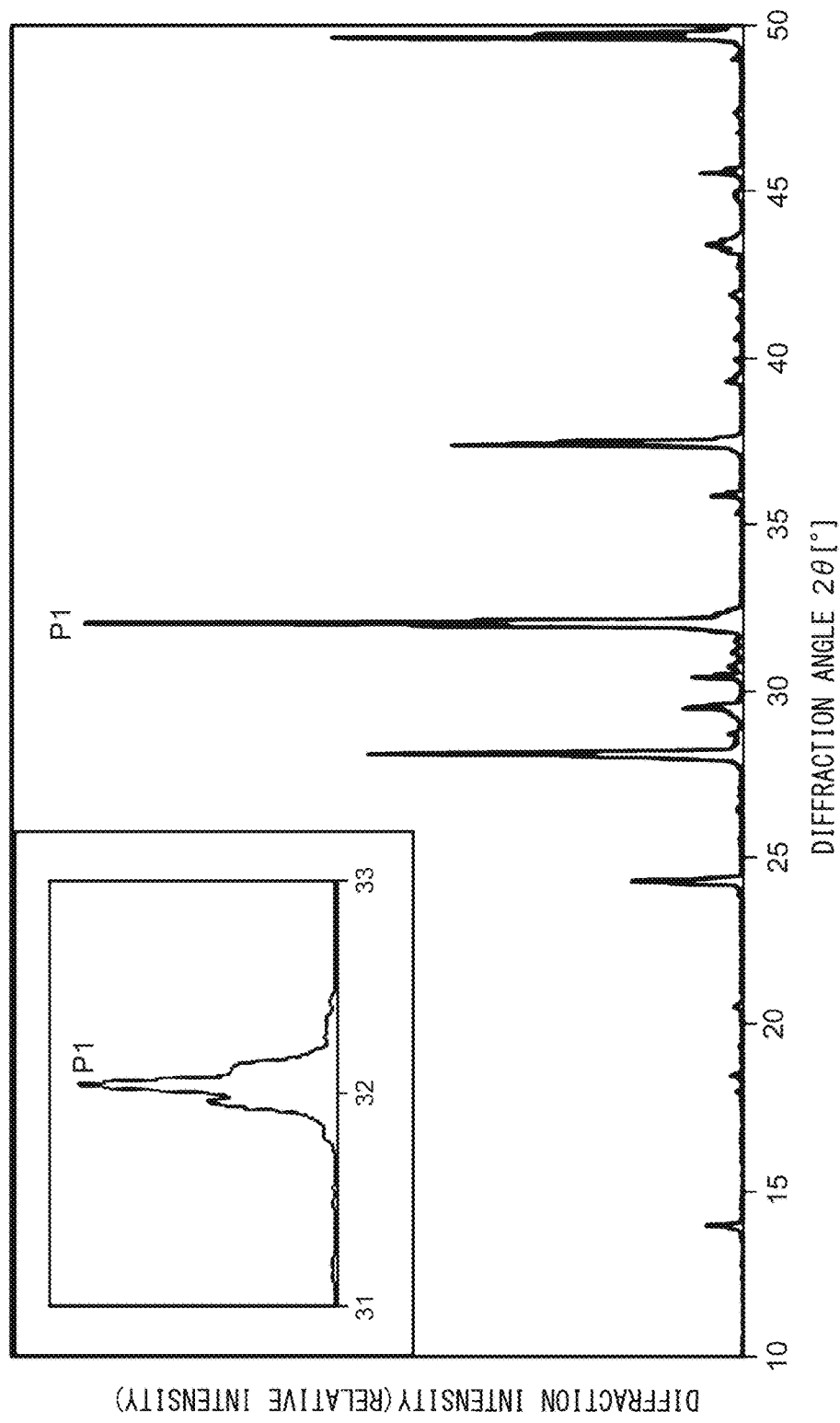
FIG. 17 illustrates an X-ray diffraction pattern of a phosphor according to Example 37.
Figure 18:
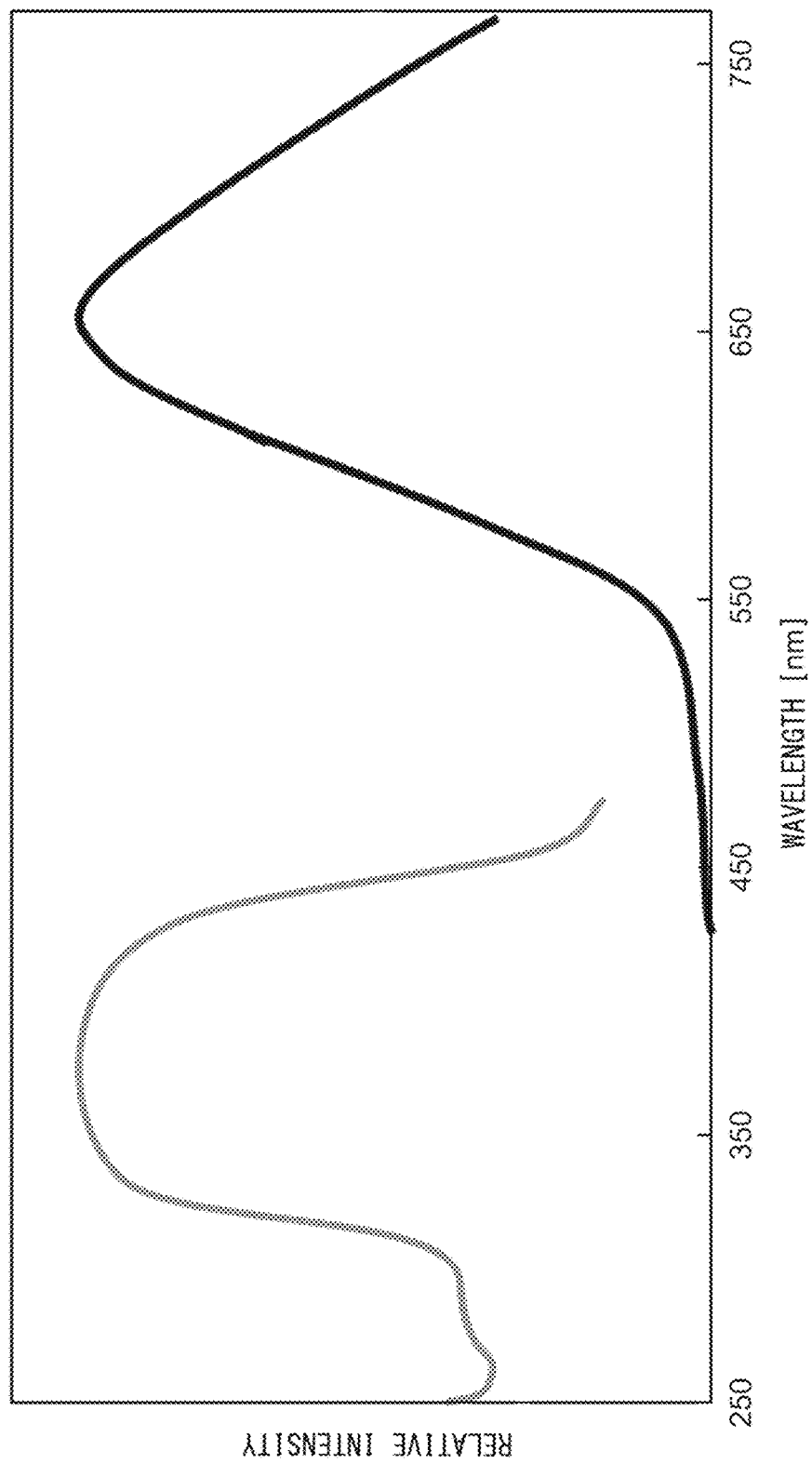
FIG. 18 illustrates an excitation spectrum and an emission spectrum of the phosphor according to Example 37.

A phosphor according to Example 37 is a phosphor represented by $KF \cdot (Ca_{0.94},Ba_{0.05})KPO_4:Eu^{2+}_{0.01}$. In other words, the solid solution amount of Ba is 0.05 mol. The phosphor according to Example 37 is manufactured through the following method. First, KF and $K_2CO_3$ powders were dried for two hours at 150° C. Then, in a glove box filled with dry $N_2$, KF, $K_2CO_3$, $CaHPO_4$, $BaCO_3$, $(NH_3)_2HPO_4$, and $Eu_2O_3$ were precisely measured to achieve a stoichiometric ratio of 1.00:0.50:0.94:0.20:0.06:0.005 (mol) and crushed and mixed in an alumina mortar, and a raw material powder mixture was obtained. Processes similar to those in Example 1 were carried out thereafter, and the phosphor according to Example 37 was obtained. FIG. 17 illustrates an X-ray diffraction pattern of the phosphor according to Example 37. FIG. 18 illustrates an excitation spectrum and an emission spectrum of the phosphor according to Example 37.

EXAMPLE 38

Figure 19:
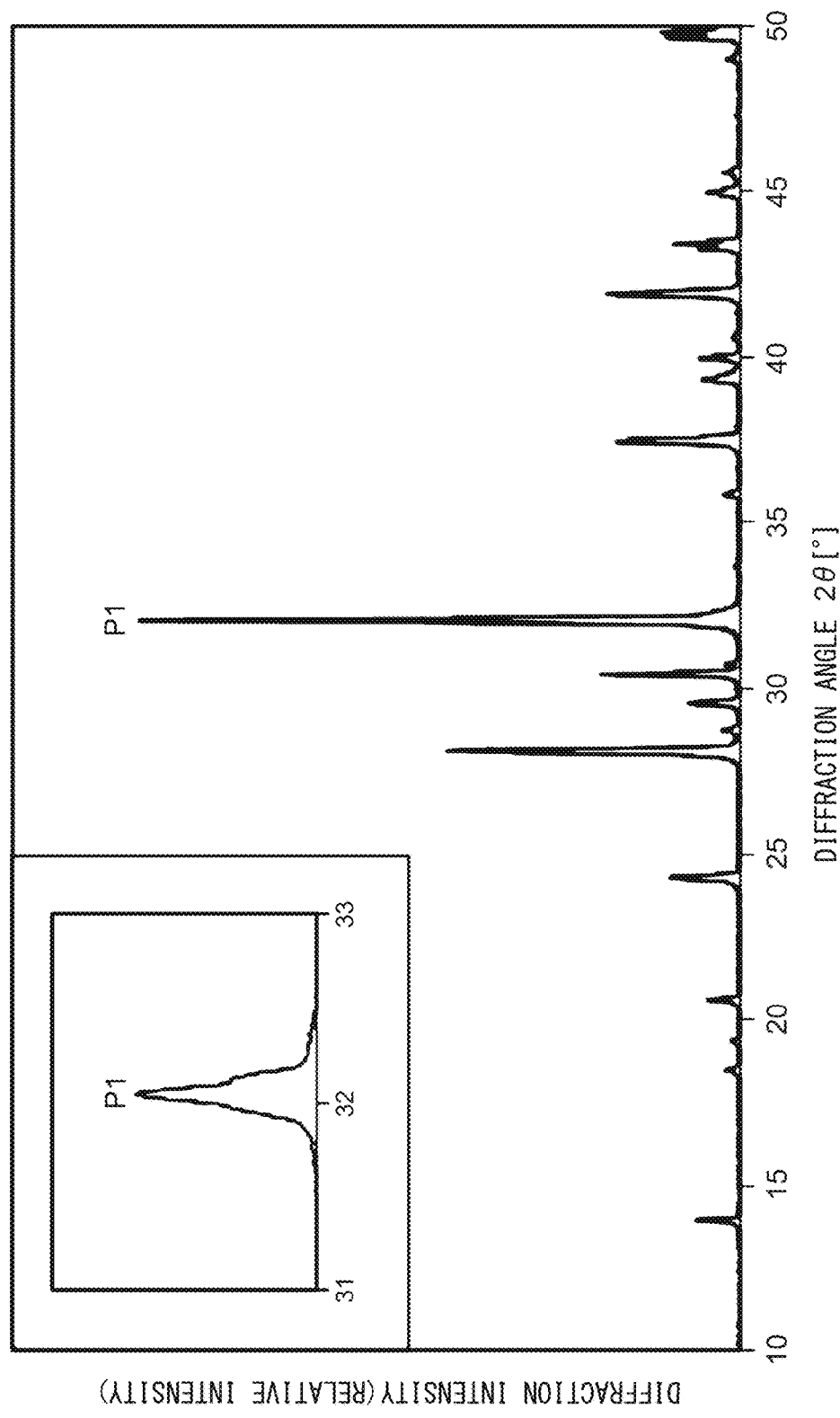
FIG. 19 illustrates an X-ray diffraction pattern of a phosphor according to Example 38.
Figure 20:
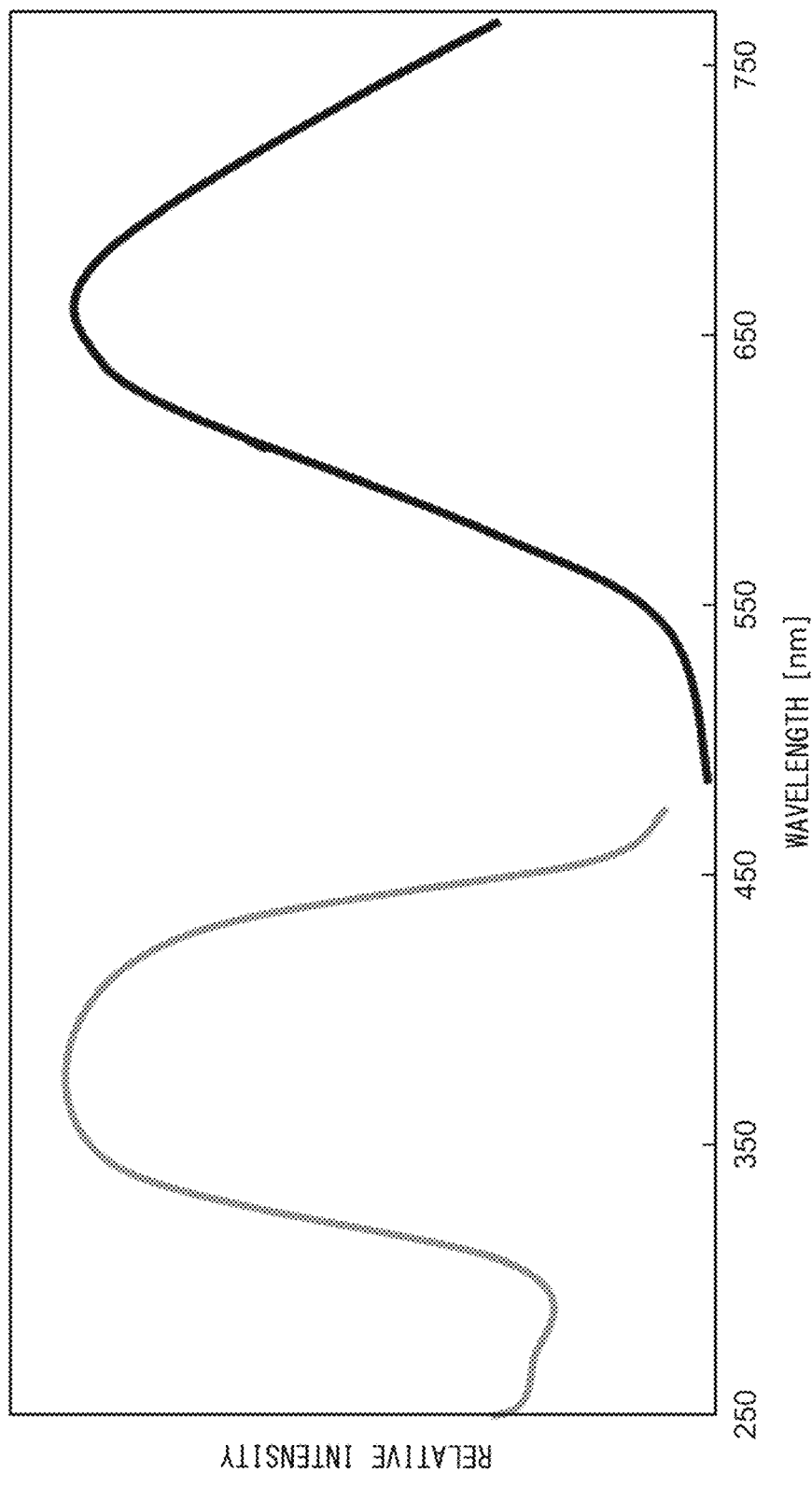
FIG. 20 illustrates an excitation spectrum and an emission spectrum of the phosphor according to Example 38.

A phosphor according to Example 38 is a phosphor represented by $KF \cdot (Ca_{0.79},Mg_{0.200})KPO_4:Eu^{2+}_{0.01}$. In other words, the solid solution amount of Mg is 0.2 mol. The phosphor according to Example 38 is manufactured through the following method. First, KF and $K_2CO_3$ powders were dried for two hours at 150° C. Then, in a glove box filled with dry $N_2$, KF, $K_2CO_3$, $CaHPO_4$, $MgCO_3$, $(NH_3)_2HPO_4$, and $Eu_2O_3$ were precisely measured to achieve a stoichiometric ratio of 1.00:0.50:0.79:0.20:0.21:0.005 (mol) and crushed and mixed in an alumina mortar, and a raw material powder mixture was obtained. Processes similar to those in Example 1 were carried out thereafter, and the phosphor according to Example 38 was obtained. FIG. 19 illustrates an X-ray diffraction pattern of the phosphor according to Example 38. FIG. 20 illustrates an excitation spectrum and an emission spectrum of the phosphor according to Example 38.

EXAMPLE 39

Figure 21:
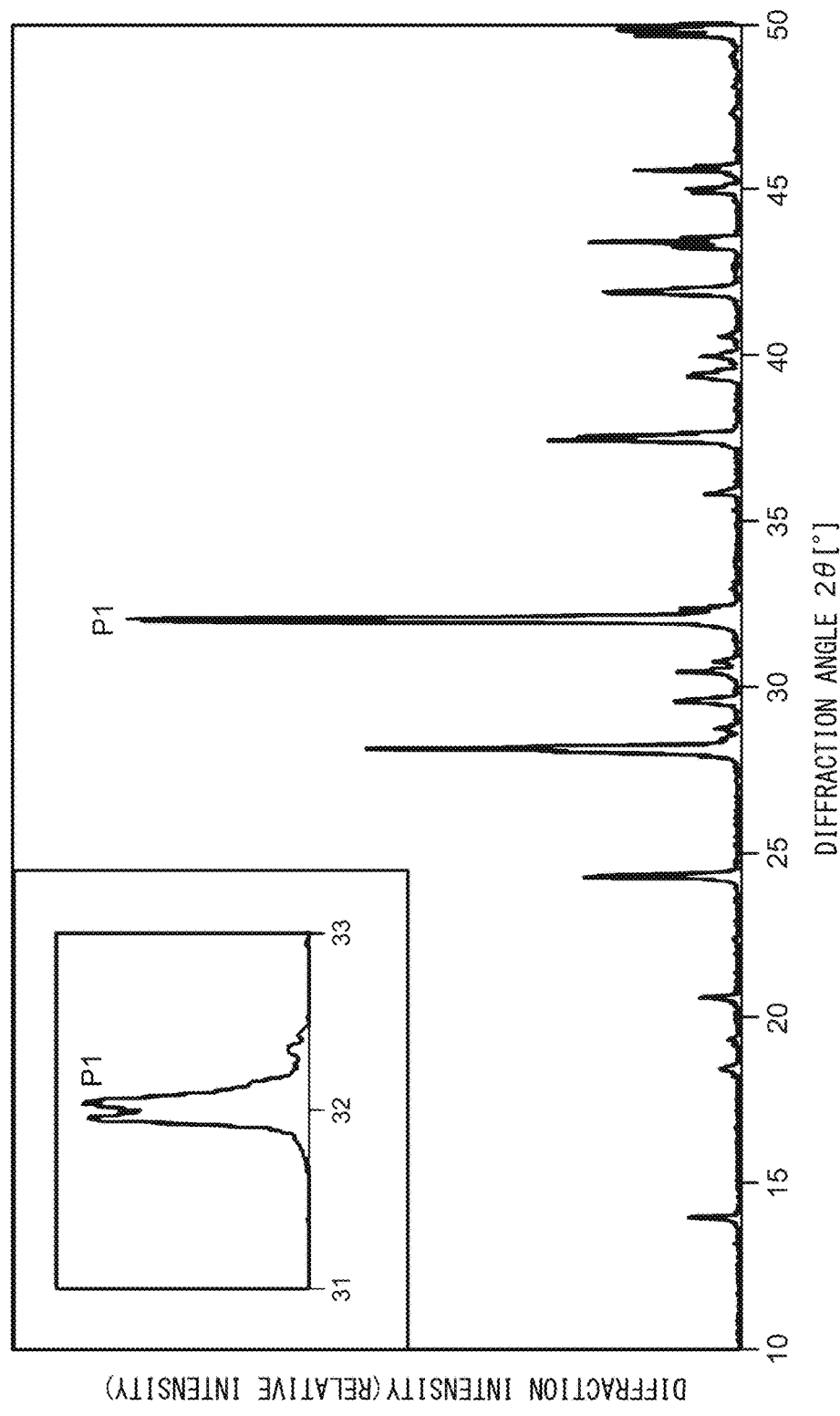
FIG. 21 illustrates an X-ray diffraction pattern of a phosphor according to Example 39.
Figure 22:
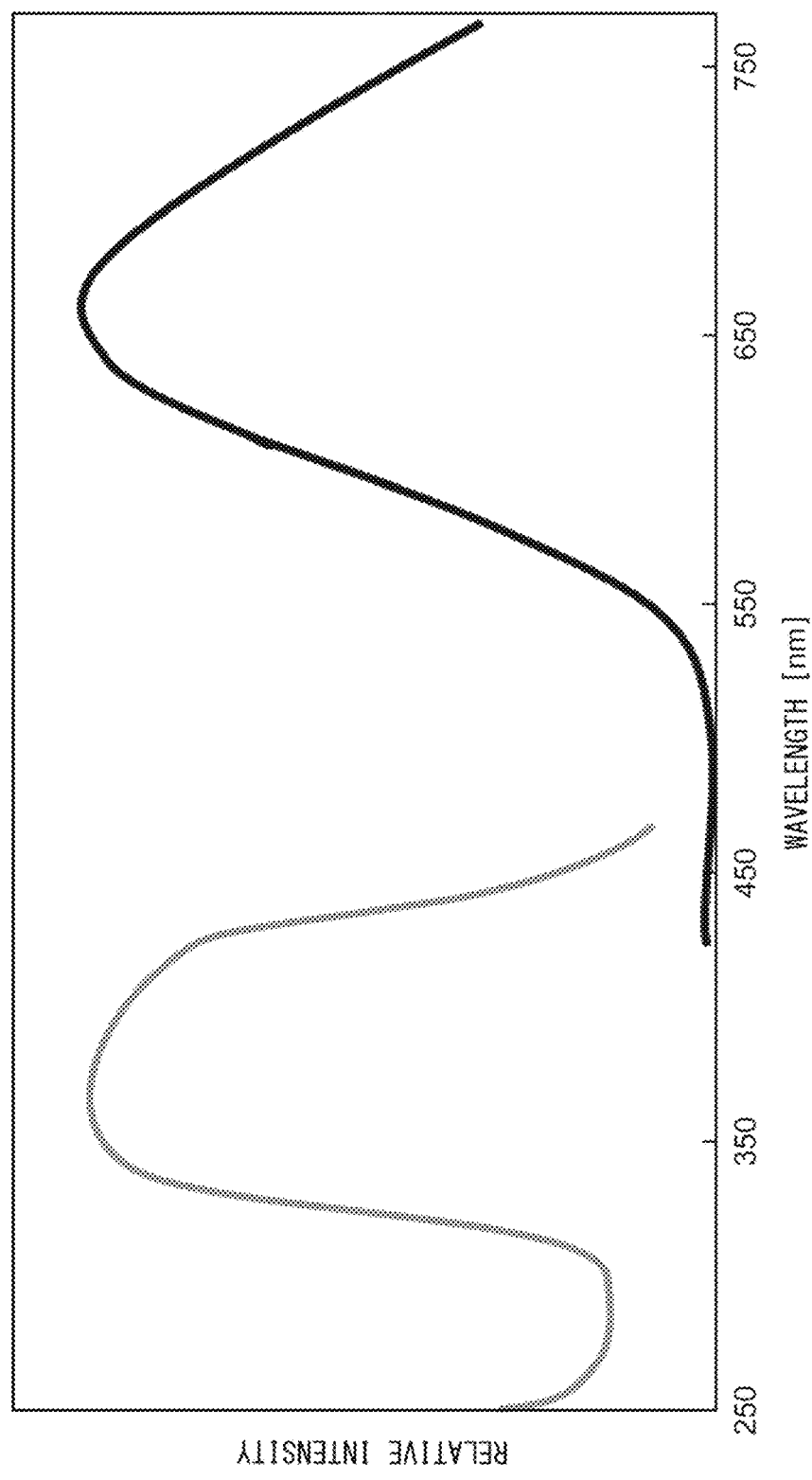
FIG. 22 illustrates an excitation spectrum and an emission spectrum of the phosphor according to Example 39.

A phosphor according to Example 39 is a phosphor represented by $(K_{0.90}, Li_{0.10})F \cdot Ca_{0.96}KPO_4:Eu^{2+}_{0.04}$. In other words, the solid solution amount of Li is 0.1 mol. The phosphor according to Example 39 is manufactured through the following method. First, KF and $K_2CO_3$ powders were dried for two hours at 150° C. Then, in a glove box filled with dry $N_2$, KF, $K_2CO_3$, LiF, $CaHPO_4$, $(NH_3)_2HPO_4$, and $Eu_2O_3$ were precisely measured to achieve a stoichiometric ratio of 0.90:0.500:0.10:0.960:0.040:0.020 (mol) and crushed and mixed in an alumina mortar, and a raw material powder mixture was obtained. Processes similar to those in Example 1 were carried out thereafter, and the phosphor according to Example 39 was obtained. FIG. 21 illustrates an X-ray diffraction pattern of the phosphor according to Example 39. FIG. 22 illustrates an excitation spectrum and an emission spectrum of the phosphor according to Example 39.

EXAMPLE 40

Figure 23:
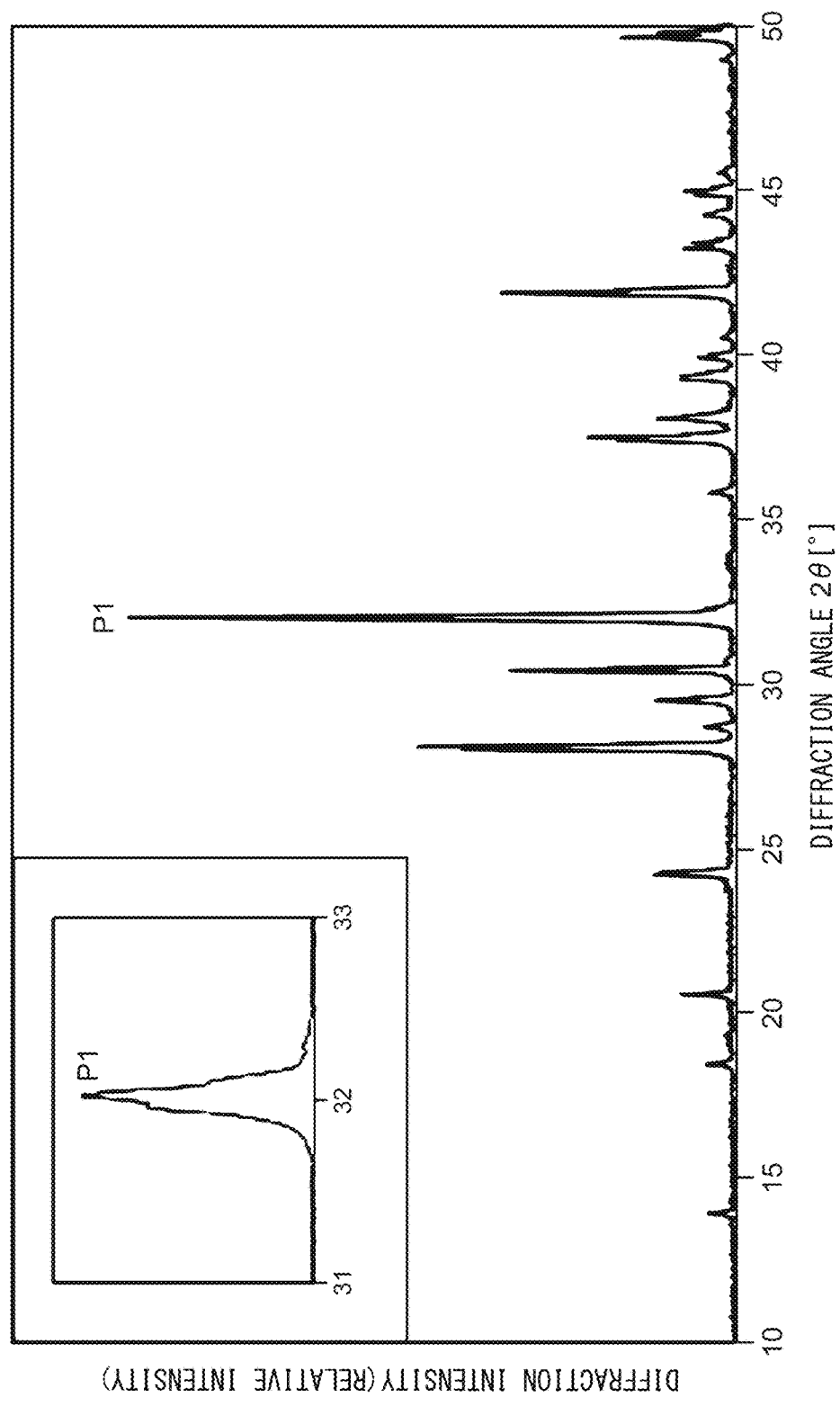
FIG. 23 illustrates an X-ray diffraction pattern of a phosphor according to Example 40.
Figure 24:
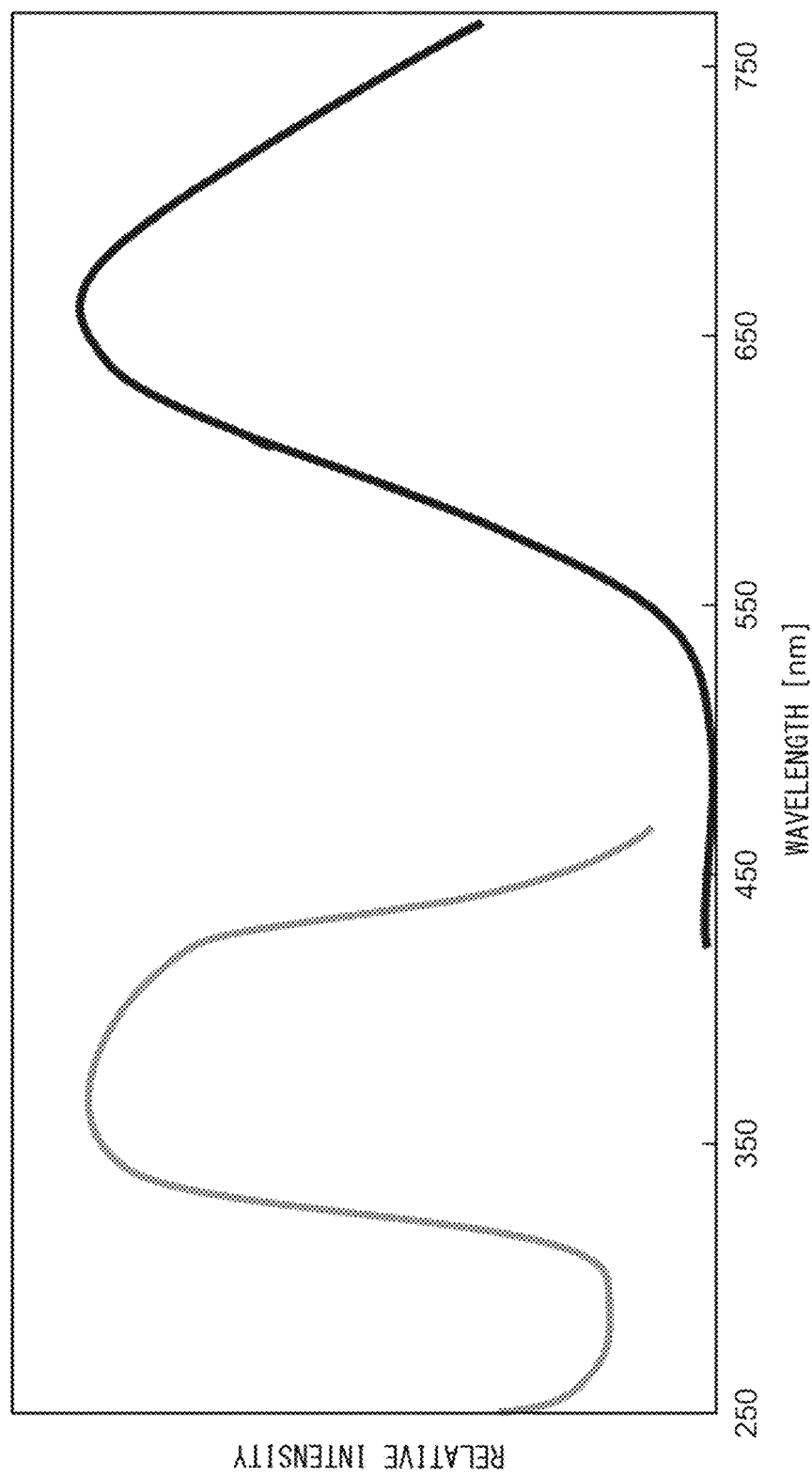
FIG. 24 illustrates an excitation spectrum and an emission spectrum of the phosphor according to Example 40.

A phosphor according to Example 40 is a phosphor represented by $(K_{0.90},Ag_{0.10})F\cdot Ca_{0.96}KPO_4:Eu^{2+}{}_{0.04}$. In other words, the solid solution amount of Ag is 0.1 mol. The phosphor according to Example 40 is manufactured through the following method. First, KF and $K_2CO_3$ powders were dried for two hours at 150° C. Then, in a glove box filled with dry $N_2$, KF, $K_2CO_3$, AgF, $CaHPO_4$, $(NH_3)_2HPO_4$, and $Eu_2O_3$ were precisely measured to achieve a stoichiometric ratio of 0.90:0.500:0.10:0.960:0.040:0.020 (mol), and each raw material and an alumina ball were placed in an alumina pot, which was then placed in a container that blocks light. Each raw material was then crushed and mixed in a rotary and revolutionary mixer while allowing argon to flow in the container, and a raw material powder mixture was obtained. Processes similar to those in Example 1 were carried out thereafter, and the phosphor according to Example 40 was obtained. FIG. 23 illustrates an X-ray diffraction pattern of the phosphor according to Example 40. FIG. 24 illustrates an excitation spectrum and an emission spectrum of the phosphor according to Example 40.

The compositions of the phosphors according to Examples 35 through 40 described above are summarized in Table 4.

The phosphor according to the present embodiment is a novel phosphor in which nitrogen is not an essential element. Accordingly, the phosphor does not need to be manufactured in a special environment, such as a deoxidized atmosphere or a high-temperature and high-pressure environment, and a low-cost phosphor can be obtained.

In addition, the peak wavelength of the excitation spectrum is no greater than 420 nm, and the excitation edge of the excitation spectrum is no greater than 450 nm. Accordingly, the phosphor is less likely to absorb light emitted by a phosphor of another color, and a variation in the chromaticity that could arise when the phosphor is applied, for example, to an apparatus that achieves white light through color mixing with light emitted by a phosphor of another color can be suppressed.

In addition, with regard to the phosphor according to the present embodiment, the peak wavelength of the emission spectrum is in a range from 600 nm to 700 nm, the peak wavelength of the excitation spectrum is no greater than 420 nm, and the excitation edge of the excitation spectrum is no greater than 450 nm. Accordingly, even in a case in which white light is to be achieved, for example, by using the phosphor in combination with a blue phosphor and a green phosphor, little light having a wavelength of blue or green is absorbed, and the chromaticity can be adjusted with ease.

[Light-Emitting Module]

Next, an example of a light-emitting module in which the red phosphor according to the present embodiment is used will be described. With regard to the red phosphor according to the present embodiment, as described above, the peak wavelength of the excitation spectrum is no greater than 420 nm, and the stated phosphor is excited with ultraviolet radiation or short-wavelength visible light. Thus, the light-emitting module according to the present embodiment includes a light-emitting element that emits ultraviolet radiation or short-wavelength visible light, the red phosphor described above, and another phosphor that is excited with ultraviolet radiation or short-wavelength visible light and radiates a color different from red.

TABLE 4

| | $aM^IX\cdot M^{II}{}_{1-x}M^IM^VO_4: (Re)_x$ | | | | | |
|---|---|---|---|---|---|---|
| | $aM^IX$ | | | $M^{II}{}_{1-x}M^IM^VO_4$ | | |
| EXAMPLE | a | $M^I$ | X | $M^{II}$ | | 1 − x |
| 35 | 1 | K = 1 | | F = 1 | Ca = 0.97 | | 0.97 |
| 36 | 1 | K = 1 | | F = 1 | Ca = 0.79 | Sr = 0.200 | 0.99 |
| 37 | 1 | K = 1 | | F = 1 | Ca = 0.94 | Ba = 0.050 | 0.99 |
| 38 | 1 | K = 1 | | F = 1 | Ca = 0.79 | Mg = 0.200 | 0.99 |
| 39 | 1 | K = 0.90 | Li = 0.10 | F = 1 | Ca = 0.96 | | 0.96 |
| 40 | 1 | K = 0.90 | Ag = 0.10 | F = 1 | Ca = 0.96 | | 0.96 |

| | $aM^IX\cdot M^{II}{}_{1-x}M^IM^VO_4: (Re)_x$ | | | | |
|---|---|---|---|---|---|
| | $M^{II}{}_{1-x}M^IM^VO_4$ | | | $(Re)_x$ | |
| EXAMPLE | $M^I$ | $M^V$ | $(M^{IV})$ | Re | x |
| 35 | K = 0.999 | P = 1 | | $Eu^{2+}$ = 0.029  $Ce^{3+}$ = 0.001 | 0.03 |
| 36 | K = 1 | P = 1 | | $Eu^{2+}$ = 0.01 | 0.01 |
| 37 | K = 1 | P = 1 | | $Eu^{2+}$ = 0.01 | 0.01 |
| 38 | K = 1 | P = 1 | | $Eu^{2+}$ = 0.01 | 0.01 |
| 39 | K = 1 | P = 1 | | $Eu^{2+}$ = 0.04 | 0.04 |
| 40 | K = 1 | P = 1 | | $Eu^{2+}$ = 0.04 | 0.04 |

The light-emitting element can be constituted, for example, by a light-emitting diode (LED), a laser diode (LD), or the like that emits ultraviolet radiation or short-wavelength visible light. Specifically, a light-emitting element formed of an InGaN-based compound semiconductor can be used. The emission wavelength range of an InGaN-based compound semiconductor varies depending on the content of In. The emission wavelength tends to be longer when the content of In is higher, and the emission wavelength tends to be shorter when the content of In is lower. It has been confirmed that an InGaN-based compound semiconductor that contains In in such an amount that brings the peak wavelength to around 400 nm exhibits the highest quantum efficiency in emission, and such an InGaN-based compound semiconductor is thus preferable.

With regard to the other phosphor, a phosphor whose emission spectrum has a peak wavelength that is longer than the peak wavelength of the excitation spectrum of the red phosphor according to the present embodiment is preferable. This configuration reduces the proportion of light emitted by the other phosphor that is absorbed by the red phosphor and converted to red. With regard to the red phosphor according to the present embodiment, the peak wavelength of the excitation spectrum is shorter than that of a conventional red phosphor. Thus, even when the red phosphor is used in combination with another phosphor, such as a blue phosphor (peak wavelength of approximately 435 nm to 495 nm), a green phosphor (peak wavelength of approximately 495 nm to 570 nm), or a yellow phosphor (peak wavelength of approximately 570 nm to 590 nm), a situation in which light emitted by the other phosphor upon being excited is absorbed by the red phosphor can be suppressed.

Thus far, the present invention has been described with reference to the foregoing embodiments and examples. The present invention, however, is not limited to the foregoing embodiments and examples, and also encompasses an embodiment or an example obtained by combining or replacing configurations of the foregoing embodiments or examples as appropriate. In addition, it is also possible to change the combinations or processing orders in each of the embodiments and examples or to add modifications such as various design changes to the foregoing embodiments or examples on the basis of the knowledge of a person skilled in the art, and an embodiment or an example obtained by adding such a modification is also encompassed within the scope of the present invention.

What is claimed is:

1. A phosphor represented by the general formula $aM^I X \cdot M^{II}_{1-x} M^I M^V O_4 : (Re)_x$, where $M^I$ is at least one atomic element selected from the group consisting of K, Li, Cs, and Ag, with K being essential;

$M^{II}$ is at least one atomic element selected from the group consisting of Mg, Ca, Mn, Zn, Cd, and Sn, with Ca being essential;

$M^V$ is at least one atomic element selected from the group consisting of P, V, Nb, Ta, Sb, and Bi, with P being essential;

X is at least one halogen element selected from the group consisting of F, Br, and I, with F being essential;

Re is at least one atomic element selected from the group consisting of Eu, Sc, Y, La, Pr, Nd, Gd, Tb, Dy, Ho, Er, Yb, Lu, and Ce, with Eu being essential, a is in the range $0.6 \leq a \leq 1.4$;

x is in a range of $0.007 \leq x \leq 0.2$; and at least one of the following conditions (1)-(5) is met:

(1) $M^I$ also includes at least one atomic element selected from the group consisting of Li, Cs, and Ag, (2) $M^{II}$ also includes at least one atomic element selected from the group consisting of Mg, Mn, Zn, Cd, and Sn, (3) $M^V$ also includes at least one atomic element selected from the group consisting of V, Nb, Ta, Sb, and Bi, (4) X also includes at least one atomic element selected from the group consisting of Br or I, and (5) Re also includes at least one atomic element selected from the group consisting of Sc, Y, La, Pr, Nd, Gd, Tb, Dy, Ho, Er, Lu, and Ce.

2. The phosphor according to claim 1, wherein a peak wavelength of an excitation spectrum is no greater than 420 nm; and an excitation edge of the excitation spectrum is no greater than 450 nm.

3. The phosphor according to claim 1, wherein a peak wavelength of an emission spectrum is in a range from 600 nm to 700 nm;

a peak wavelength of an excitation spectrum is no greater than 420 nm; and an excitation edge of the excitation spectrum is no greater than 450 nm.

4. The phosphor according to claim 1, wherein in an X-ray diffraction pattern in which a Cu Kα characteristic X-ray is used, at least part of a crystal included in the phosphor has:

a first diffraction peak, a second diffraction peak, and a third diffraction peak in a range in which a diffraction angle 2θ is from 31.0° to 33.0°, and when a diffraction intensity of the first diffraction peak, which has the highest intensity, is taken as 100, the diffraction intensities of the second diffraction peak and of the third diffraction peak are from 30 to 50 ;

a fourth diffraction peak having a diffraction intensity of from 15 to 25 in a range in which the diffraction angle 2θ is from 27.0° to 29.0°;

a fifth diffraction peak having a diffraction intensity of from 15 to 25 in a range in which the diffraction angle 2θ is from 41.0° to 43.0°;

a sixth diffraction peak having a diffraction intensity of from 10 to 15 in a range in which the diffraction angle 2θ is from 29.0° to 31.0°;

a seventh diffraction peak having a diffraction intensity of from 10 to 15 in a range in which the diffraction angle 2θ is from 36.0° to 39.0°; and an eighth diffraction peak having a diffraction intensity of from 5 to 10 in a range in which the diffraction angle 2θ is from 13.0° to 15.0 °.

5. The phosphor according to claim 1, wherein at least part of a crystal included in the phosphor has an orthorhombic crystal system, a simple Bravais lattice, and a P21/m space group.

* * * * *